United States Patent
Kuo et al.

(12)

(10) Patent No.: US 10,281,070 B2
(45) Date of Patent: May 7, 2019

(54) PIPE COUPLER

(71) Applicant: Janice Lin, Kaohsiung (TW)

(72) Inventors: Shu-Ming Kuo, Kaohsiung (TW);
Yu-Hsuan Chen, Taichung (TW);
Yen-Ting Hsieh, Taichung (TW);
Janice Lin, Kaohsiung (TW)

(73) Assignee: Janice Lin, Kaohsiung (TW)

( * ) Notice: Subject to any disclaimer, the term of this patent is extended or adjusted under 35 U.S.C. 154(b) by 369 days.

(21) Appl. No.: 15/373,816

(22) Filed: Dec. 9, 2016

(65) Prior Publication Data

US 2017/0248258 A1 Aug. 31, 2017

(30) Foreign Application Priority Data

Feb. 26, 2016 (TW) .............................. 105105792 A

(51) Int. Cl.
*F16L 23/06* (2006.01)
*F16B 2/10* (2006.01)
*F16L 23/04* (2006.01)

(52) U.S. Cl.
CPC ................ *F16L 23/06* (2013.01); *F16B 2/10* (2013.01); *F16L 23/04* (2013.01); *F16L 2201/20* (2013.01)

(58) Field of Classification Search
CPC ....... F16L 23/04; F16L 23/06; F16L 2201/20; F16B 2/10
See application file for complete search history.

(56) References Cited

U.S. PATENT DOCUMENTS

| | | | | |
|---|---|---|---|---|
| 4,466,437 A | * | 8/1984 | Dyck | ........................ F16B 2/10 606/201 |
| 6,622,347 B1 | * | 9/2003 | Cottrill | ................... F16L 23/06 24/272 |
| 2007/0069519 A1 | * | 3/2007 | Wu | ......................... F16L 23/06 285/420 |
| 2009/0211063 A1 | * | 8/2009 | Ginocchio | ................ F16B 2/10 24/270 |
| 2012/0227221 A1 | | 9/2012 | Whitaker et al. | |

FOREIGN PATENT DOCUMENTS

| | | | | |
|---|---|---|---|---|
| DE | | 977078 C | * 1/1965 | ............. F16L 23/04 |
| WO | WO-2013089118 A1 | | * 6/2013 | ................ F16B 2/10 |

OTHER PUBLICATIONS

Search Report and Written Opinion issued to Singapore counterpart application No. 10201701435V by the Intellectual Property Office of Singapore dated Mar. 9, 2018.

* cited by examiner

*Primary Examiner* — David Bochna
(74) *Attorney, Agent, or Firm* — Occhiuti & Rohlicek LLP

(57) ABSTRACT

A pipe coupler includes a first jaw member, a first jaw extension, a second jaw member defining an open channel, a mounting board, a ratchet, and a first biasing member. The first and second jaw members are hinged to each other. The mounting board extends outwardly from the open channel of the second jaw member. The first jaw extension extends from the first jaw member, and is configured to extend into the open channel. The first jaw extension has a plurality of rack teeth. The ratchet is rotatably mounted on the mounting board, and has a plurality of ratchet teeth configured to mesh with the rack teeth. The first jaw extension is permitted to drive the ratchet to rotate unidirectionally against a first biasing force of the first biasing member.

15 Claims, 22 Drawing Sheets

PIPE COUPLER

CROSS-REFERENCE TO RELATED APPLICATION

This application claims priority from Taiwanese patent application no. 105105792, filed on Feb. 26, 2016.

FIELD

The disclosure relates to a pipe coupler, more particularly to a pipe coupler for interconnecting joining regions of two pipes.

BACKGROUND

With reference to FIG. 1, a conventional pipe coupler 9 for interconnecting joining regions 81 of two pipes 8 is shown to include a first jaw member 91, a second jaw member 92, a screw member 93, and a tightening member 94. Each of the first and second jaw member 91, 92 has a hinged end 901 and a locked end 902, and has an inner peripheral surface 903. The hinged ends 901 of the first and second jaw members 91, 92 are hinged to each other. The screw member 93 has a pivot end 931 mounted pivotably to the locked end 902 of the first jaw member 91, and a threaded body 933 which extends from the pivot end 931 through the locked end 902 of the second jaw member 92, and which has a male threaded region 934. The tightening member 94 includes an abutment segment 940 which is disposed to abut against the locked end 902 of the second jaw member 92, and which has a through hole 941 and a female threaded region (not shown) in the through hole 941. The female threaded region is configured to threadably engage the male threaded region 934 to permit the abutment segment 940 to rotatably sleeve on the threaded body 933. When the tightening member 94 is driven to rotate to move toward the locked end 902 of the first jaw member 91, the locked ends 902 of the first and second jaw members 91, 92 are forced by the abutment segment 940 to move toward each other and the inner peripheral surfaces 903 of the first and second jaw members 91, 92 are tightened against the joining regions 81 of the two pipes 8 to thereby provide a fluid-tightness between the joining regions 81 of the two pipes 8.

However, for providing a sufficient fluid-tightness between the joining regions 81 of the two pipes 8, a tool is used to apply on the tightening member 94 a relatively large force, which may cause wearing of the male threaded region 934 or the female threaded region.

SUMMARY

Therefore, an object of the disclosure is to provide a novel pipe coupler by which two pipes can be easily joined together or separated without using a tool.

According to a first aspect of the disclosure, a pipe coupler is used for interconnecting two pipes each having a joining region and each extending along a pipe axis in a longitudinal direction, and includes a first jaw member, a second jaw member, a first jaw extension, a tooth member, a control unit, and a locking mechanism. The first jaw member has a first hinged end segment and a first locking end segment. The second jaw member includes a second hinged end segment which is hinged to the first hinged end segment, and a second locking end segment which is movable toward and away from the first locking end segment. The first and second jaw members are capable to define therebetween a clamping space configured to secure therein the joining regions of the two pipes. The first jaw extension extends from the first locking end segment, and includes a rack region. The tooth member is rotatably mounted inside the second locking end segment, and is configured to mesh with the rack region. The control unit is configured to permit the tooth member to be driven by the rack region to rotate unidirectionally. The locking mechanism includes an engaging member and an engaged member. The engaging member is mounted pivotably on one of the first and second locking end segments. The engaged member is mounted on the other one of the first and second locking end segments, and has an engaged surface configured to be engaged by the engaging member so as to permit the first and second locking end segments to be locked together.

According to a second aspect of the disclosure, a pipe coupler is used for interconnecting two pipes each having a joining region and each extending along a pipe axis in a longitudinal direction, and includes a first jaw unit, a second jaw member, a mounting board, a ratchet, a first biasing member, and a release member. The first jaw unit includes a first jaw member and a first jaw extension. The first jaw member extends in a circumferential direction about the pipe axis to terminate at a first hinged end segment and a first locking end segment, and has a first inner peripheral surface. The first jaw extension extends from the first locking end segment along the circumferential direction, and has a plurality of rack teeth displaced from each other in the circumferential direction. The second jaw member extends in the circumferential direction to terminate at a second hinged end segment and a second locking end segment, and has a second inner peripheral surface. The second locking end segment defines therein an open channel which extends along the circumferential direction, and which has an inner guiding region and an outer mounting region. The second hinged end segment is hinged to the first hinged end segment about a hinge axis parallel to the pipe axis so as to permit the first jaw extension to be movable among an unclamped position, where the first jaw extension is disposed outwardly of the inner guiding region, a partially clamped position, where the first jaw extension is partially extended into the inner guiding region, and a fully clamped position, where the first jaw extension is deeply extended into the inner guiding region such that the first and second inner peripheral surfaces of the first and second jaw members are tightened against the joining regions of the two pipes thereby allowing the two pipes to be brought into fluid-tight engagement with each other. The mounting board extends outwardly from the outer mounting region, and has a mounting surface. The ratchet is mounted rotatably on the mounting surface about a rotation axis parallel to the pipe axis, and has a plurality of ratchet teeth which are angularly displaced from each other about the rotation axis, and which are configured to mesh with the rack teeth at the outer mounting region so as to permit the ratchet to be driven by the rack teeth to rotate about the rotation axis. The first biasing member is disposed such that the first jaw extension is permitted to drive the ratchet to rotate unidirectionally against a first biasing force of the first biasing member. The release member has a pivot end segment and a distal end segment. The pivot end segment is mounted pivotally on the mounting surface about a pivot axis, and is configured to counteract the first biasing force of the first biasing member such that the pivot end segment is angularly movable between an actuated position, where the pivot end segment is disposed to ensure unidirectional rotation of the ratchet, and a non-actuated position, where the ratchet is relieved of the first biasing force of the first biasing member. The distal end segment is angularly movable between a retained position, where the pivot end segment is in the actuated position, and an unretained position, wherein the pivot end segment is in the non-actuated position.

BRIEF DESCRIPTION OF THE DRAWINGS

Other features and advantages of the disclosure will become apparent in the following detailed description of the embodiments with reference to the accompanying drawings, in which.

DETAILED DESCRIPTION

Figure 1:
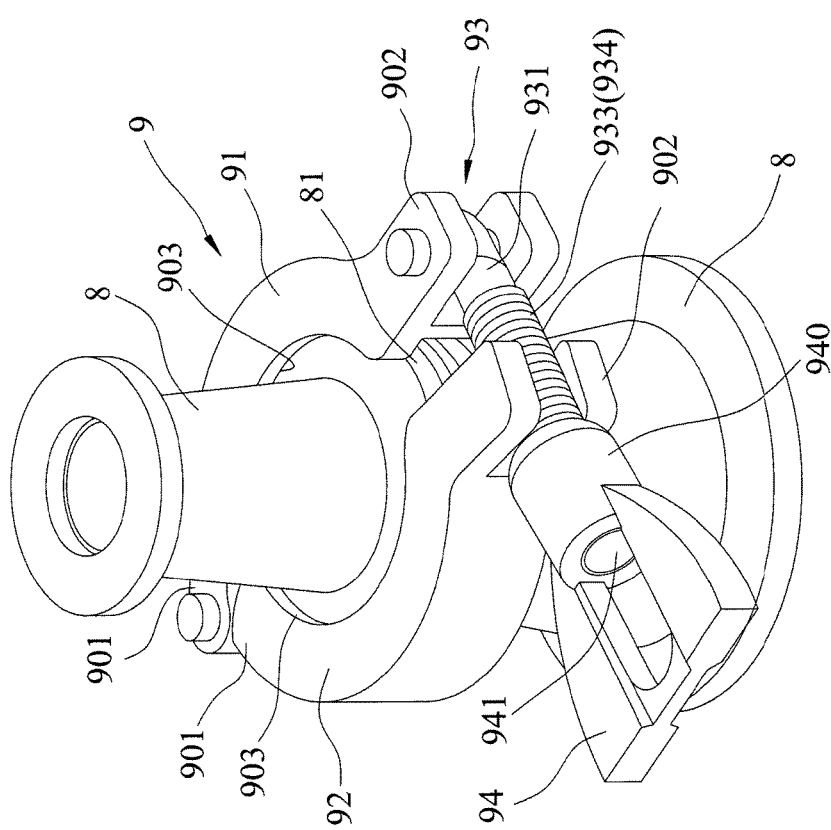
FIG. 1 is a perspective view of a conventional pipe coupler.

Before the disclosure is described in greater detail, it should be noted that where considered appropriate, reference numerals have been repeated among the figures to indicate corresponding or analogous elements, which may optionally have similar characteristics.

Figure 2:
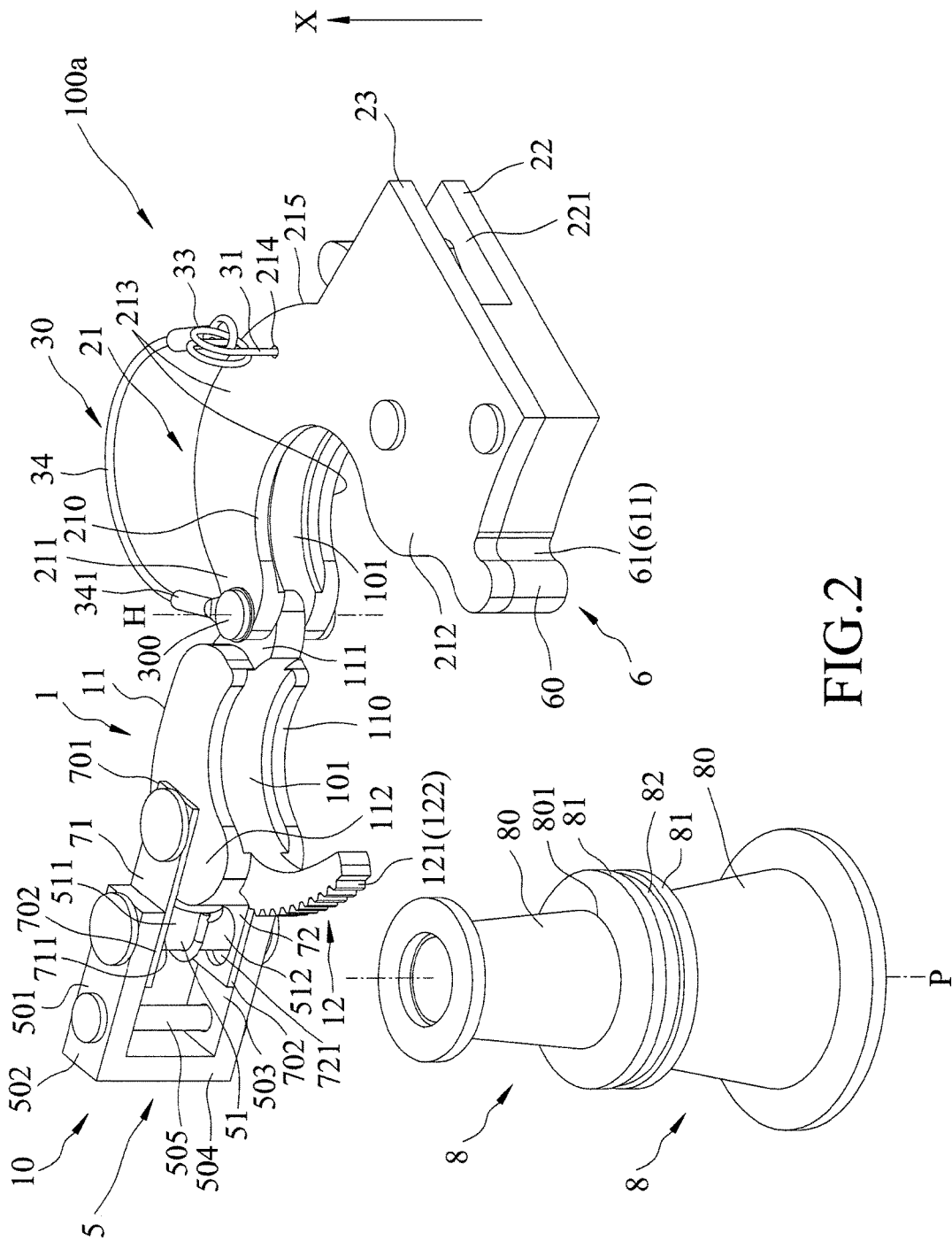
FIG. 2 is a perspective view of a pipe coupler according to a first embodiment of the disclosure.
Figure 3:
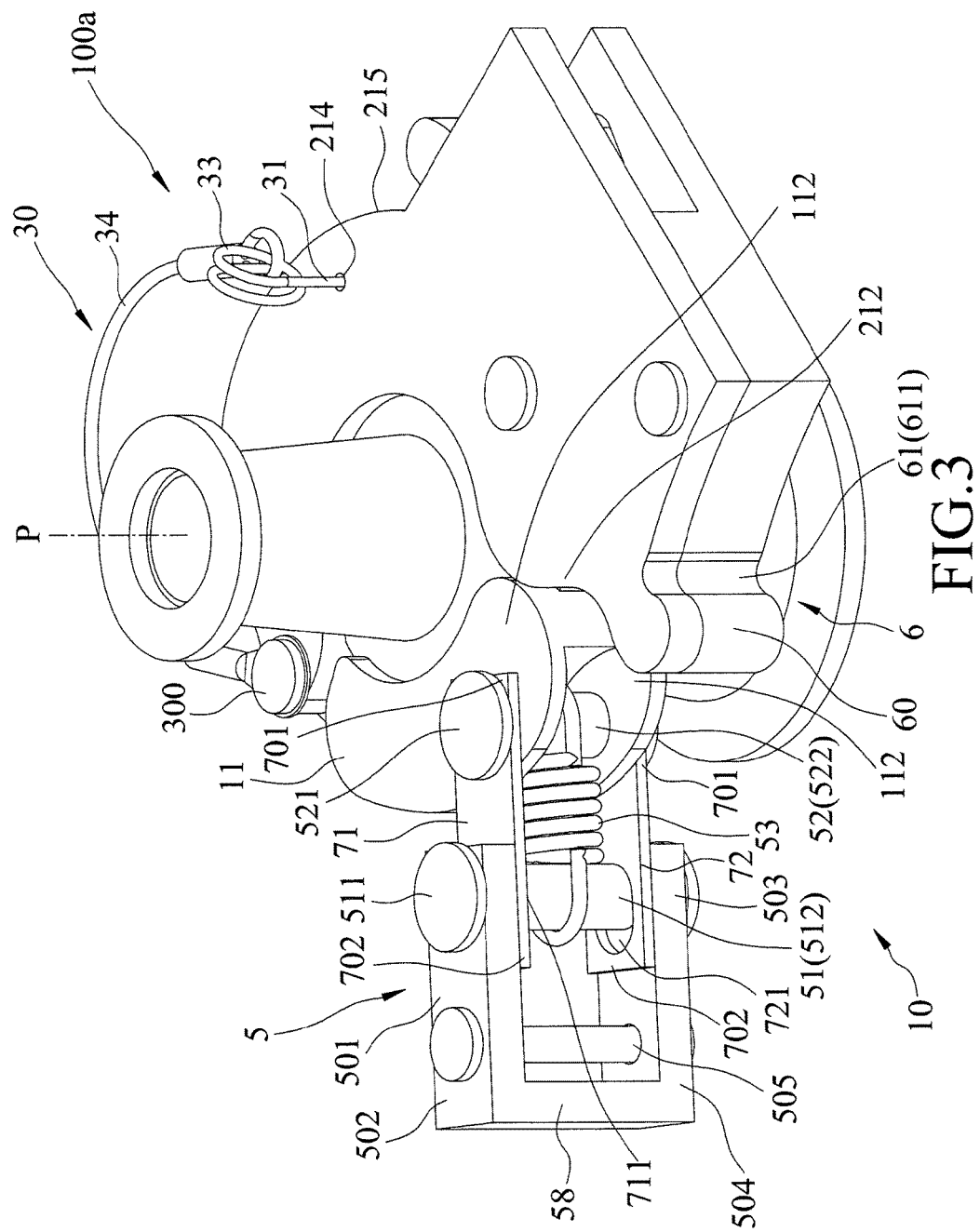
FIG. 3 is similar to FIG. 2 but illustrating that two pipes are brought, by the pipe coupler, into fluid-tight engagement with each other.
Figure 4:
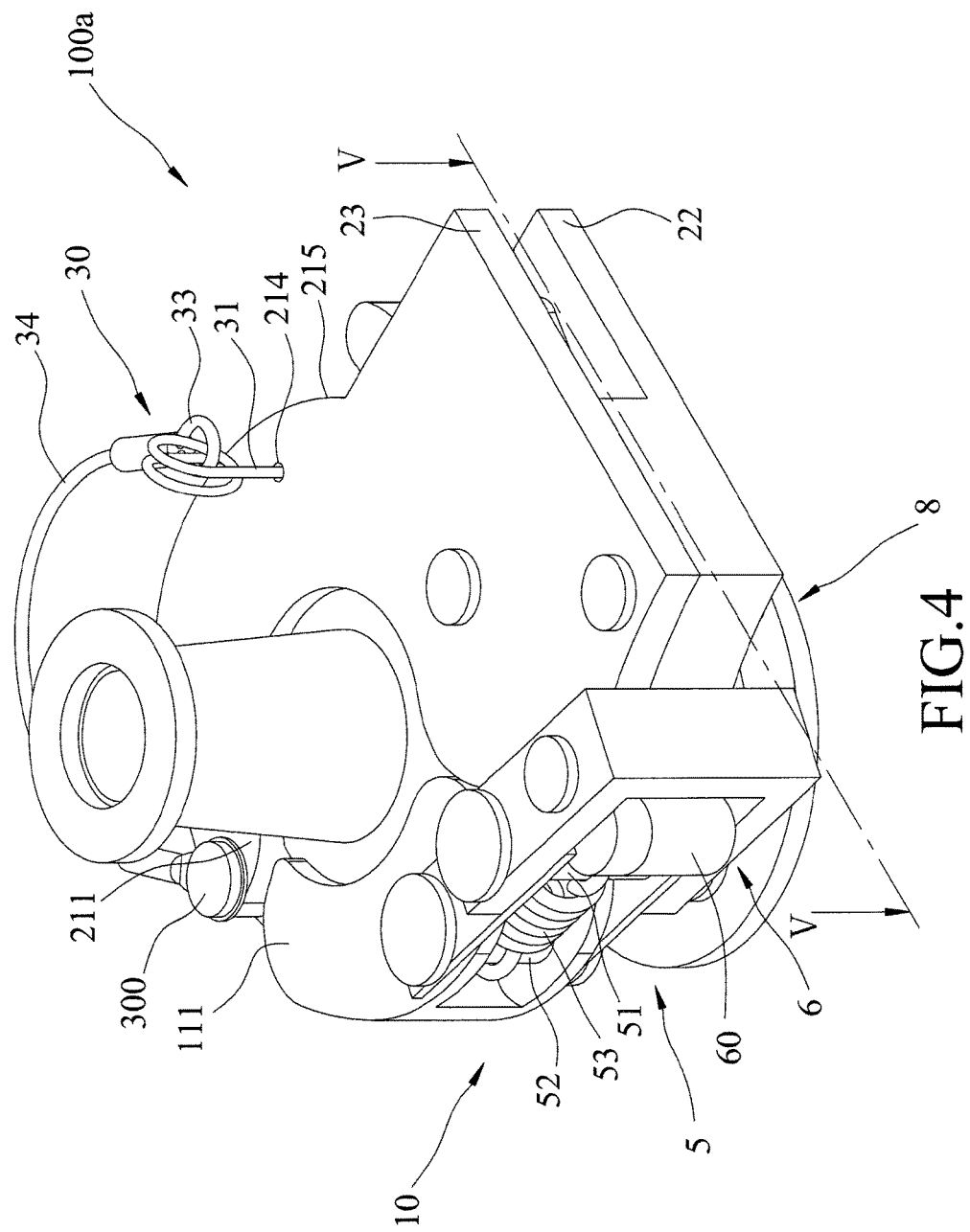
FIG. 4 is similar to FIG. 3 but illustrating that first and second locking end segments of first and second jaw members are locked together by virtue of a locking mechanism.

With reference to FIGS. 2 to 4, a pipe coupler 100a according to a first embodiment of the disclosure is used for interconnecting two pipes 8 each having a joining region 81, and each extending along a pipe axis (P) in a longitudinal direction (X). As best shown in FIG. 2, each of the two pipes 8 has a pipe body 80 extending in the longitudinal direction (X) to terminate at a pipe edge 801, and an annular flange 81 extending radially from the pipe edge 801 to serve as the joining region. A gasket 82 may be optionally provided between the annular flanges 81 of the two pipes 8.

Figure 5:
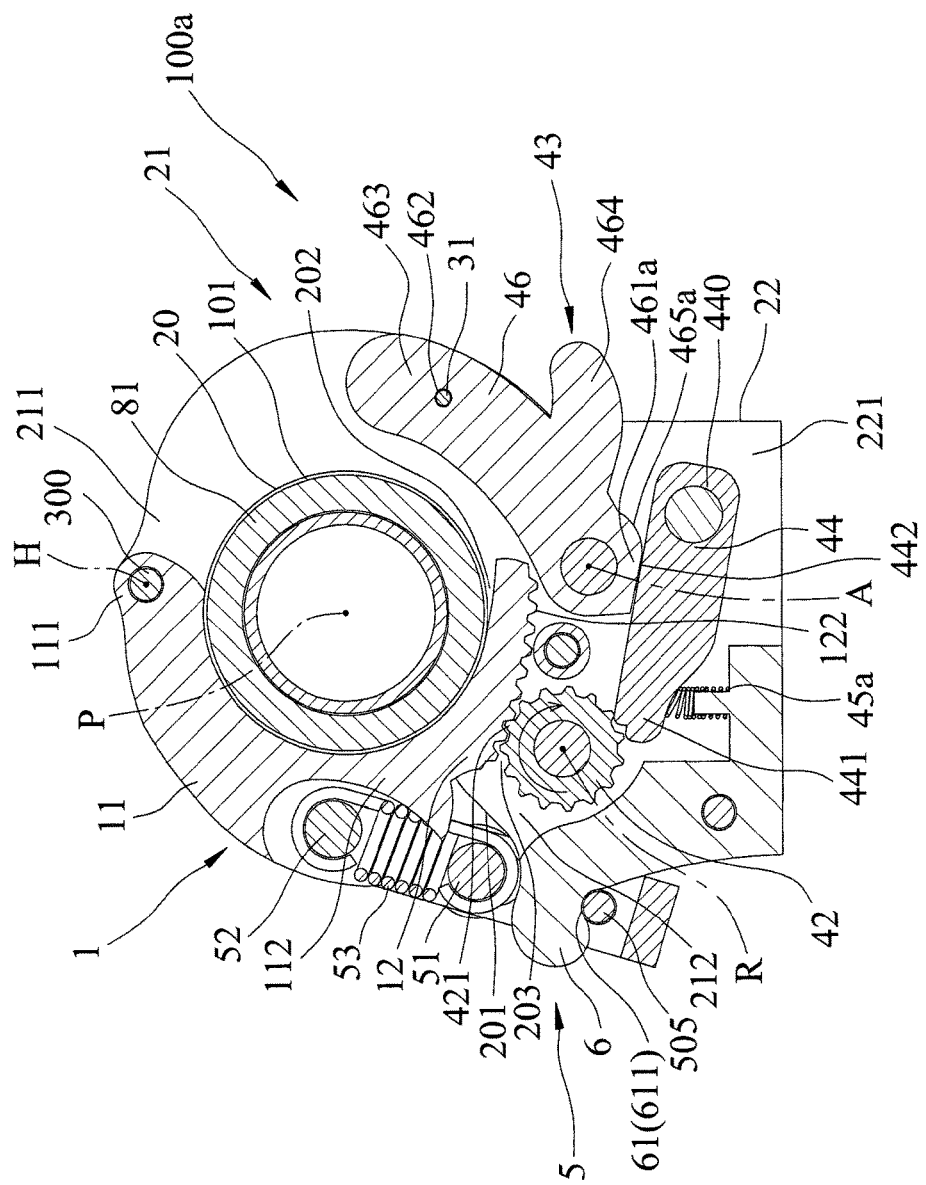
FIG. 5 is a cross-sectional view taken along line V-V of FIG. 4.

As shown in FIGS. 2 and 5, the pipe coupler 100a includes a first jaw unit 1, a second jaw member 21, a mounting board 22, a tooth member (i.e., a ratchet 42), and a control unit 43.

The first jaw unit 1 includes a first jaw member 11 and a first jaw extension 12. The first jaw member 11 extends in a circumferential direction about the pipe axis (P) to terminate at a first hinged end segment 111 and a first locking end segment 112, and has a first inner peripheral surface 110. The first jaw extension 12 extends from the first locking end segment 112 along the circumferential direction, and includes a rack region 121 having a plurality of rack teeth 122 which are displaced from each other in the circumferential direction.

The second jaw member 21 extends in the circumferential direction to terminate at a second hinged end segment 211 and a second locking end segment 212, and has a second inner peripheral surface 210. The second locking end segment 212 defines therein an open channel 201. As shown in FIG. 5, the open channel 201 extends along the circumferential direction, and has an inner guiding region 202 and an outer mounting region 203. The second hinged end segment 211 is hinged to the first hinged end segment 111 about a hinge axis (H) parallel to the pipe axis (P) so as to permit the first jaw extension 12 to be movable among an unclamped position (see FIG. 2), a partially clamped position, and a fully clamped position (see FIGS. 3 to 5).

In the unclamped position, the first jaw extension 12 is disposed outwardly of the inner guiding region 202.

In the partially clamped position, the first jaw extension 12 is partially extended into the inner guiding region 202.

In the fully clamped position, the first jaw extension 12 is deeply extended into the inner guiding region 202 such that the first and second inner peripheral surfaces 110, 210 of the first and second jaw members 11, 21 are tightened against the joining regions 81 of the two pipes 8 thereby allowing the two pipes 8 to be brought into fluid-tight engagement with each other.

In this embodiment, in the fully clamped position, the first and second inner peripheral surfaces 110, 210 of the first and second jaw members 11, 21 defines therebetween a clamping space 20 (see FIG. 5) configured to secure therein the joining regions 81 of the two pipes 8.

Referring back to FIG. 2, it can be observed that each of the first and second inner peripheral surfaces 110, 210 of the first and second jaw members 11, 21 has a jaw groove region 101 which extends in the circumferential direction, and which is configured such that when the first jaw extension 12 is in fully clamped position (see FIG. 5), the joining regions 81 of the two pipes 8 are permitted to be brought into fitting engagement in the jaw groove region 101.

In this embodiment, the second jaw member 21 has two sidewall surfaces 213 opposite to each other in the longitudinal direction (X), and a through bore 214 extending through the two sidewall surfaces 213 of the second jaw member 21.

As shown in FIG. 5, the mounting board 22 extends outwardly from the outer mounting region 203 and has a mounting surface 221.

The ratchet 42 is mounted rotatably on the mounting surface 221 about a rotation axis (R) parallel to the pipe axis (P), and has a plurality of ratchet teeth 421 which are angularly displaced from each other about the rotation axis (R), and which are configured to mesh with the rack teeth 122 at the outer mounting region 203 so as to permit the ratchet 42 to be driven by the rack teeth 122 to rotate about the rotation axis (R).

The control unit 43 is configured to permit the ratchet 42 to be driven by the rack region 121 to rotate unidirectionally, and includes a first biasing member 45a and a release member 46.

The first biasing member 45a is disposed such that the first jaw extension 12 is permitted to drive the ratchet 42 to rotate unidirectionally against a first biasing force of the first biasing member 45a.

Figure 7:
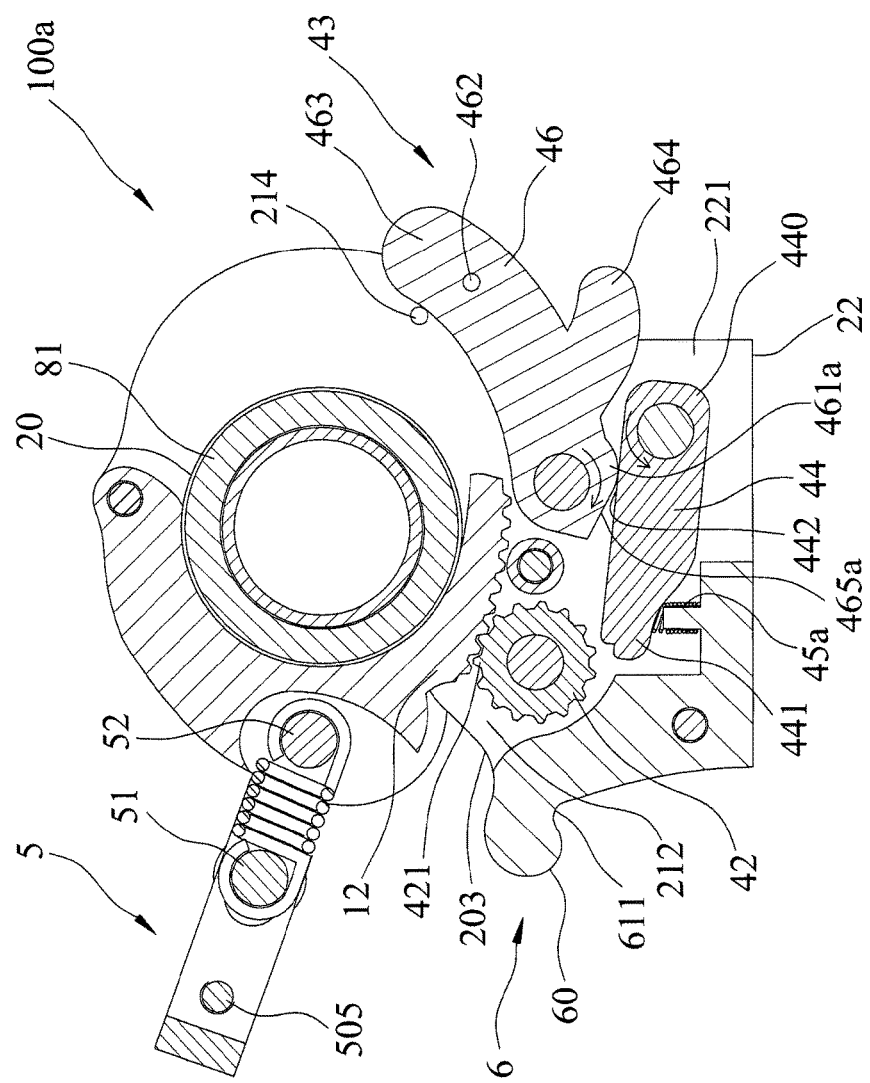
FIG. 7 is cross-sectional view taken along line VII-VII of FIG. 6.

The release member 46 has a pivot end segment 461a and a distal end segment 463. The pivot end segment 461a is mounted pivotally on the mounting surface 221 about a pivot axis (A), and is configured to counteract the first biasing force of the first biasing member 45a such that the pivot end segment 461a is angularly movable between an actuated position (see FIG. 5), where the pivot end segment 461a is disposed to ensure unidirectional rotation of the ratchet 42, and a non-actuated position (see FIG. 7), where the ratchet 42 is relieved of the first biasing force of the first biasing member 45a. The distal end segment 463 is angularly movable between a retained position (see FIG. 5), where the pivot end segment 461a is in the actuated position, and an unretained position (see FIG. 7), wherein the pivot end segment 461a is in the non-actuated position.

In this embodiment, the distal end segment 463 of the release member 46 has a through hole 462 (see FIGS. 5 and 7) which is in alignment with the through bore 214 of the second jaw member 21 when the distal end segment 463 of the release member 46 is in the retained position.

Figure 6:
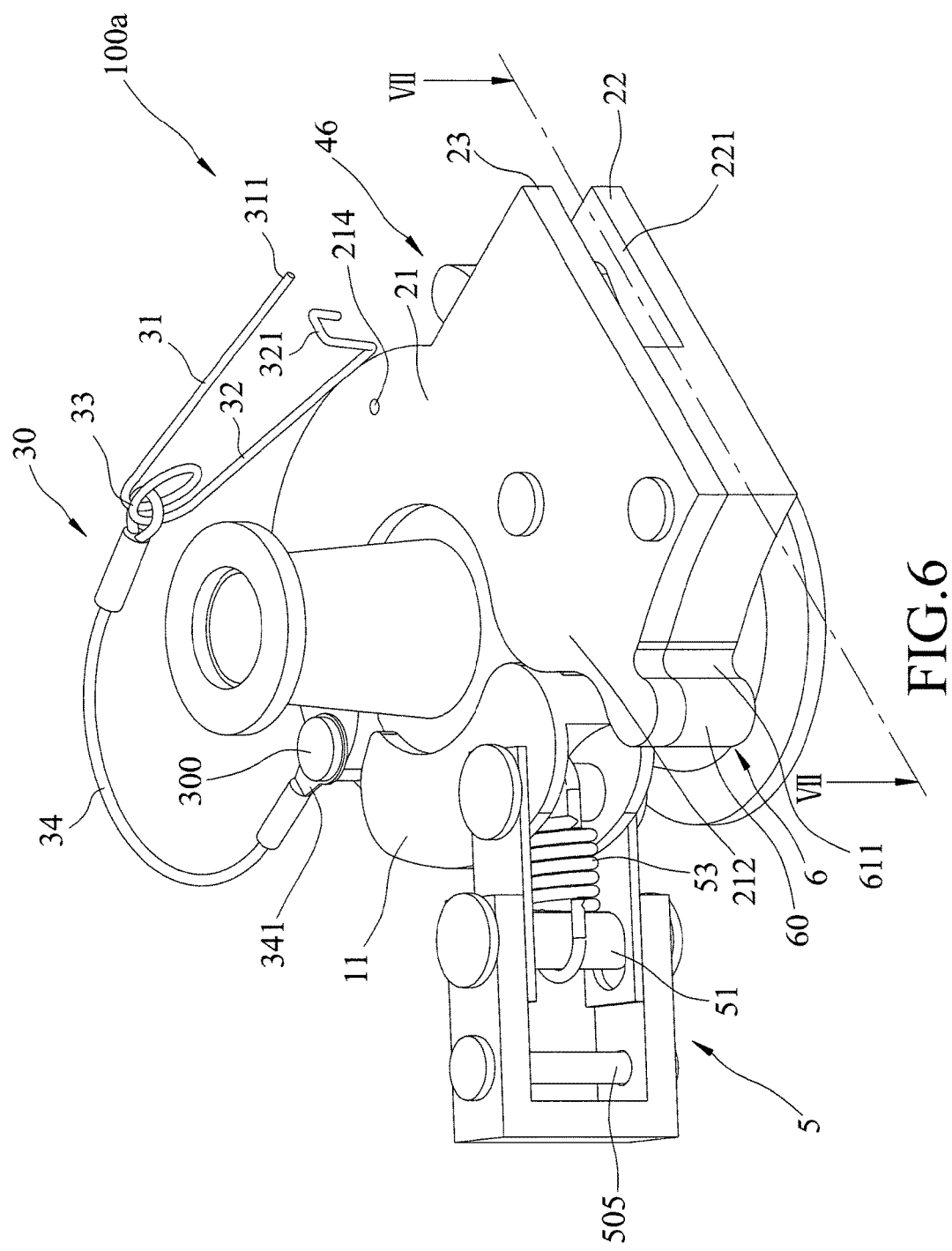
FIG. 6 is similar to FIG. 3 but illustrating that a first pin segment of a pin member is removed from a second jaw member.

In this embodiment, as best shown in FIG. 6, the pipe coupler 100a further includes a pin member 30 having a spring segment 33, a first pin segment 31, and a second pin segment 32. The first pin segment 31 extends from the spring segment 33 to terminate at a pin end 311. The second pin segment 32 extends from the spring segment 33 to terminate at a hook end 321. The first and second pin segments 31, 32 are arranged such that when the first pin segment 31 extends through the through bore 214 and the through hole 462, the pin end 311 of the first pin segment 31 is permitted to be hooked by the hook end 321 of the second pin segment 32 so as to prevent the distal end segment 463 of the release member 46 from moving away from the retained position (see FIG. 5).

Furthermore, as shown in FIGS. 2 and 6, the pin member 30 further has a linking segment 34 extending from the spring segment 33 to terminate at a linking end 341. The linking end 341 is pivotally mounted to a hinge shaft 300 through which the first and second hinged end segment 111, 211 are hinged to each other.

As shown in FIG. 5, the control unit 43 further includes a pawl member 44 having a fulcrum region 440, a weight region 441, and a power region 442. The fulcrum region 440 is mounted pivotally on the mounting surface 221 of the mounting board 22. The weight region 441 is disposed to be biased by the first biasing member 45a to engage with the ratchet 42 such that the ratchet 42 is driven to rotate unidirectionally. The power region 442 is disposed between the fulcrum region 440 and the weight region 441.

In addition, the pivot end segment 461a of the release member 46 has a cam surface 465a which extends about the pivot axis (A), and which acts against the power region 442 to generate a camming action such that when the pivot end segment 461a of the release member 46 is moved to the actuated position (see FIG. 5), the weight region 441 is engaged with the ratchet 42, and such that when the pivot end segment 461a of the release member 46 is moved to the non-actuated position (see FIG. 7), the weight region 442 is moved against the first biasing force of the first biasing member 45a to be disengaged from the ratchet 42.

In this embodiment, the release member 46 further has a drive lever segment 464 disposed between the pivot end segment 461a and the distal end segment 463. In operation, a user may hold the drive lever segment 464 to move the pivot end segment 461a between the actuated position and the non-actuated position.

In this embodiment, the pipe coupler 100a further includes a shielding member 23 (see FIG. 2). The shielding member 23 extends from a peripheral edge 215 of a corresponding one of the two sidewall surfaces 213 of the second jaw member 21 over the mounting board 22 so as to cover the ratchet 42. The second jaw member 21, the shielding member 23, and the mounting board 22 are integrally formed.

When the distal end segment 463 of the release member 46 is in the retained position, and when the first jaw extension 12 is moved to the fully clamped position, a fluid-tightness between the joining regions 81 of the two pipes 8 can be provided by the pipe coupler 100a (see FIG. 3).

In this embodiment, the pipe coupler 100a further includes a locking mechanism 10 which is configured to lock the first and second locking end segments 112, 212 together. As best shown in FIG. 3, the locking mechanism 10 includes a first cantilever 71, a second cantilever 72, an engaging member 5, a second biasing member 53, and an engaged member (i.e., an anchor member 6).

The first cantilever 71 extends from one of the first and second locking end segments 112, 212, and has a first guiding slot 711.

The second cantilever 72 extends from said one of the first and second locking end segments 112, 212, and has a second guiding slot 721 in alignment with the first guiding slot 711.

The engaging member 5 is mounted pivotably on said one of the first and second locking end segments 112, 212. As shown in FIG. 3, the engaging member 5 includes a movable key 51 which extends parallel to the pipe axis (P) to terminate at a first end segment 511 and a second end segment 512. The first and second end segments 511, 512 of the movable key 51 are slidably and respectively engaged in the first and second guiding slots 711, 721 so as to permit the movable key 51 to be movable between a distal position and a proximate position relative to said one of the first and second locking end segments 112, 212.

The second biasing member 53 is disposed to bias the movable key 51 to the proximate position.

The anchor member 6 is mounted on the other one of the first and second locking end segments 112, 212. The anchor member 6 has a guide wall 60 and an engaged surface 61 defining a recess 611 such that once the first jaw extension 12 is in the fully clamped position, the movement of the movable key 51 toward the distal position against a second biasing force of the second biasing member 53 permits the engaging member 5 to slip over the guide wall 60 and be retained in the recess 611 by virtue of the second biasing force.

In this embodiment, each of the first and second cantilevers 71, 72 extends from the first locking end segment 112, and the anchor member 6 is mounted on the second locking end segment 212.

In this embodiment, the locking mechanism 10 further includes a pivot pin 52 extending through the first locking end segment 112 to terminate at a first pin end segment 521 and a second pin end segment 522. The second biasing member 53 is disposed to couple the movable key 51 to the pivot pin 52 so as to bias the movable key 51 to the proximate position. Each of the first and second cantilevers 71, 72 has a pivot end segment 701 mounted pivotally to a corresponding one of the first and second pin end segments 521, 522 of the pivot pin 52, and a connected end segment 702 having a corresponding one of the first and second guiding slots 711, 721.

Furthermore, the engaging member 5 further includes a first bar 501, a second bar 503, and an engaging pin 505. The first bar 501 extends from the first end segment 511 of the movable key 51 in a direction away from the first cantilever 71 to terminate at a first bar end segment 502 so as to permit the first bar 501 to move with the movable key 51. The second bar 503 extends from the second end segment 512 of the movable key 51 in a direction away from the second cantilever 72 to terminate at a second bar end segment 504 so as to permit the second bar 503 to move with the movably key 51. The engaging pin 505 interconnects the first and second bar end segments 502, 504, and is configured to be retained in the recess 611 as shown in FIG. 5. In this embodiment, a bridging bar 58 is disposed to bridge the first and second bars 501, 503.

With the provision of the locking mechanism 10, the fluid-tightness between the joining regions 81 of the two pipes 8 can be further ensured (see FIG. 4).

In this embodiment, all the elements of the pipe coupler 100a may be made from a stainless material.

FIGS. 8 to 16 illustrate a pipe coupler 100b according to a second embodiment of the disclosure. The second embodiment is similar to the first embodiment, except the configurations of the ratchet 42 and the control unit 43.

Figure 12:
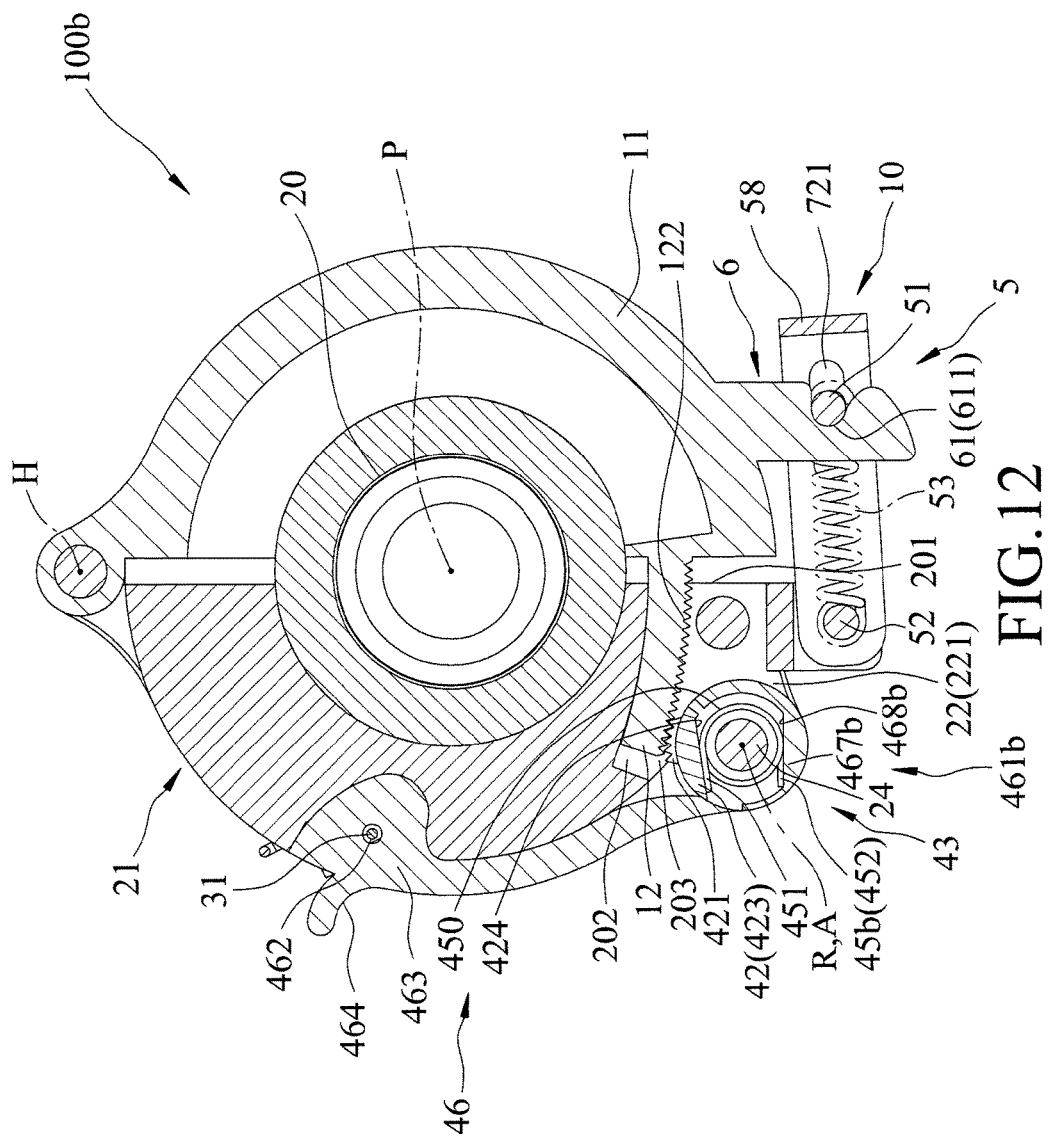
FIG. 12 is a cross-sectional view taken along line XII-XII of FIG. 11.
Figure 13:
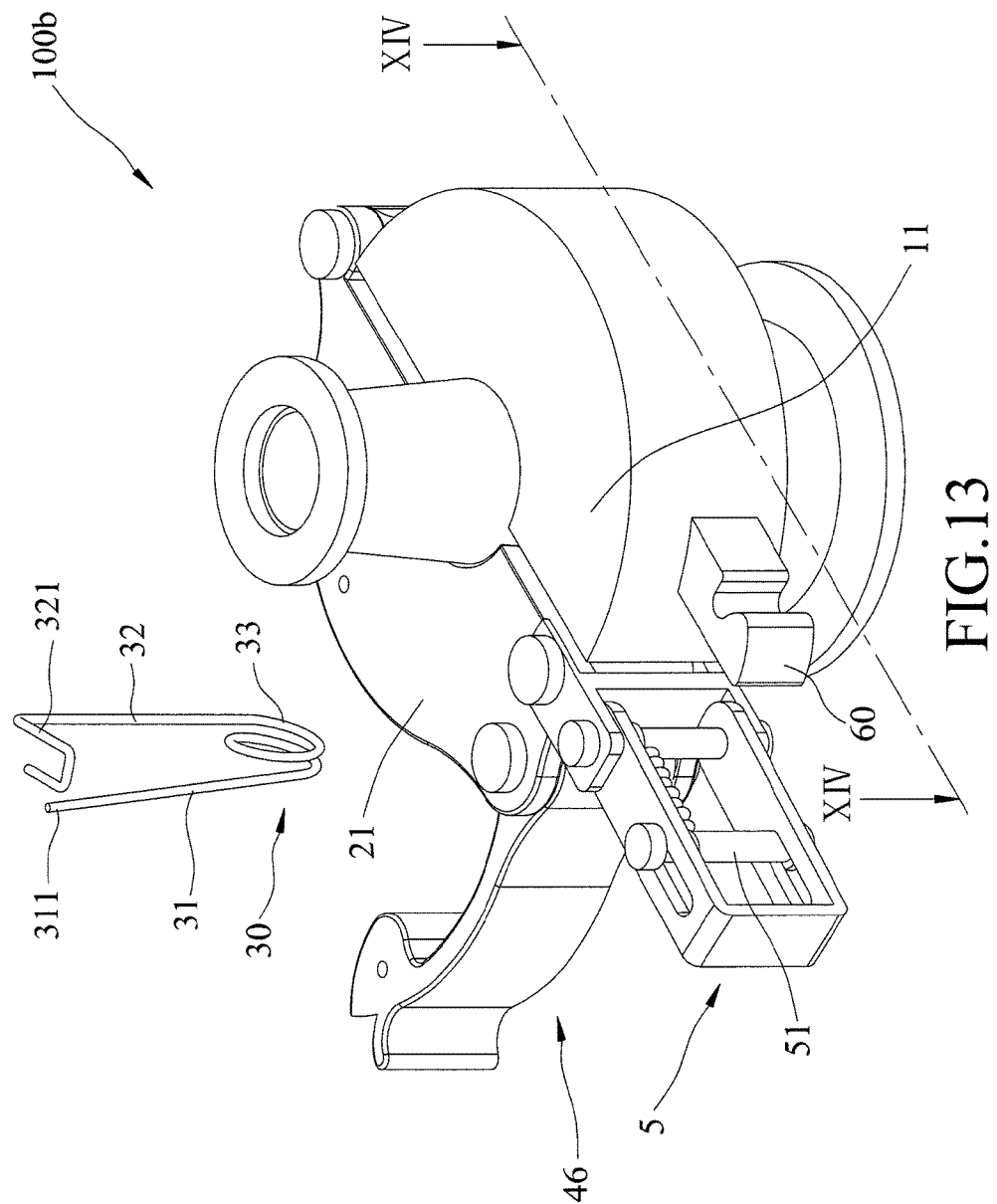
FIG. 13 is similar to FIG. 11 but illustrating a distal end segment of a release member in an unretained position.
Figure 14:
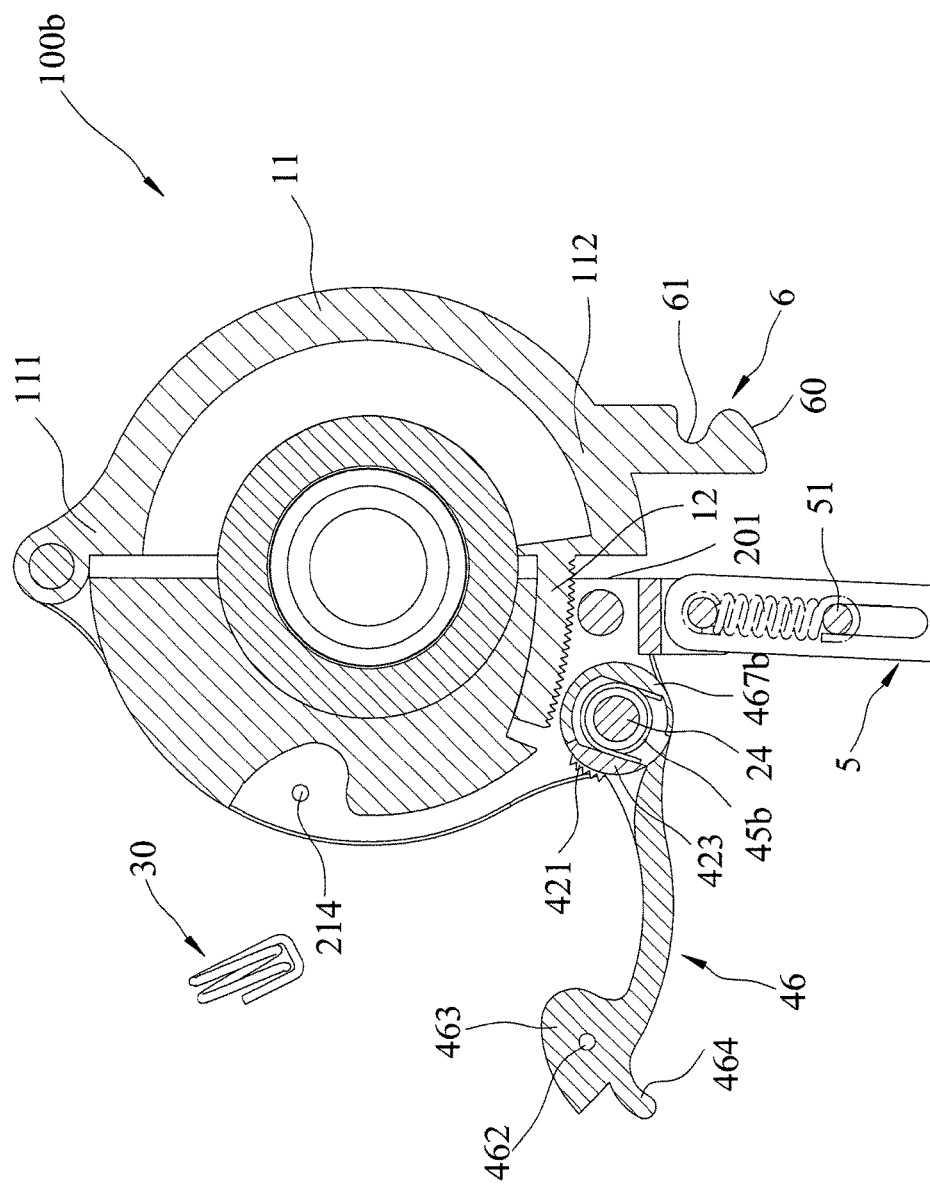
FIG. 14 is a cross-sectional view taken along line XIV-XIV of FIG. 13.

In the second embodiment, as best shown in FIG. 12, the control unit 43 includes a first biasing member 45b, a release member 46, and a pivot shaft 24. The first biasing member 45b is disposed such that the first jaw extension 12 is permitted to drive the ratchet 42 to rotate unidirectionally against a first biasing force of the first biasing member 45b. The pivot shaft 24 is mounted on the mounting surface 221 and extends along the rotation axis (R).

Figure 15:
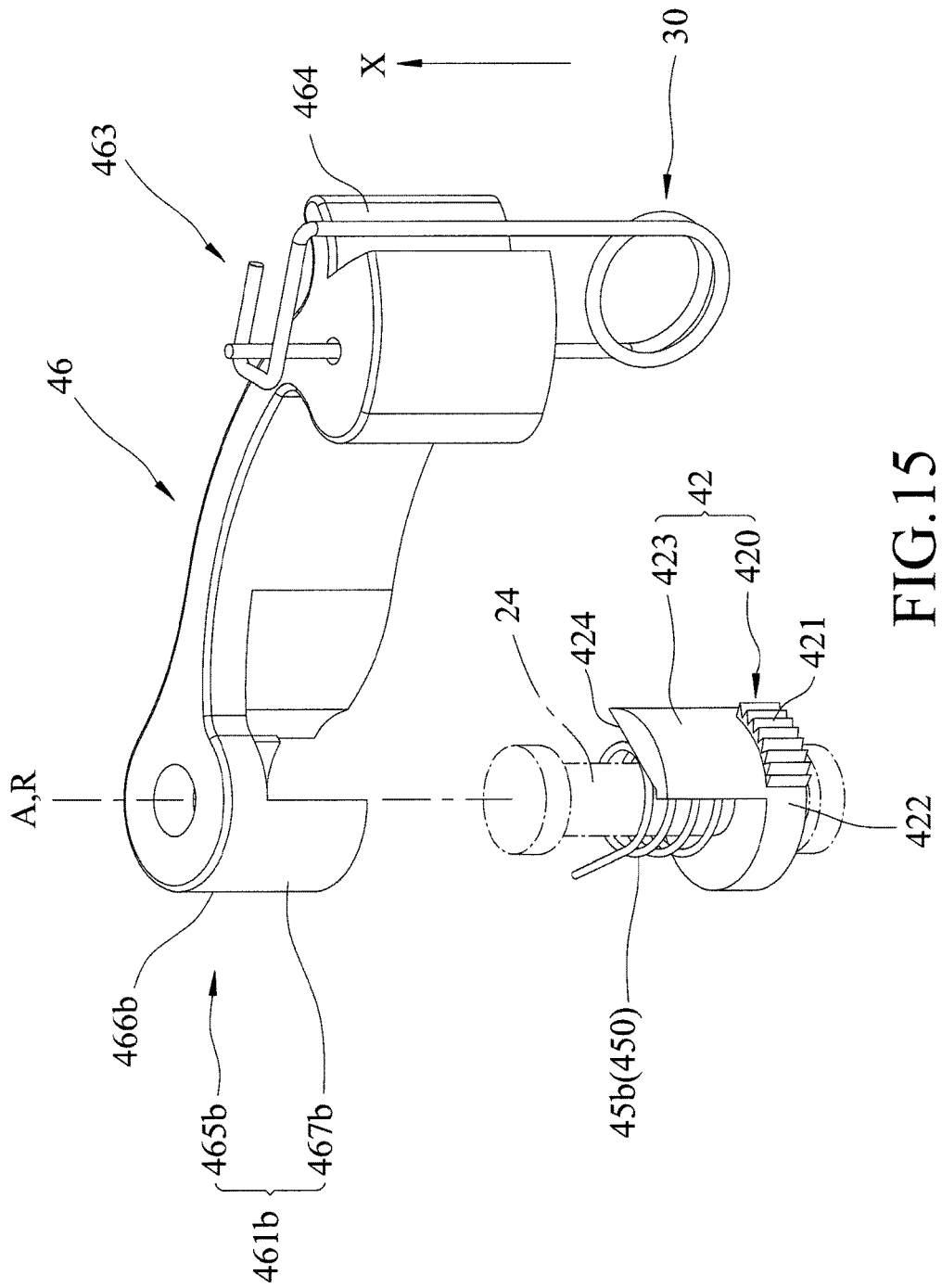
FIG. 15 is an exploded perspective view of a ratchet and a control unit according to the second embodiment of the disclosure.
Figure 16:
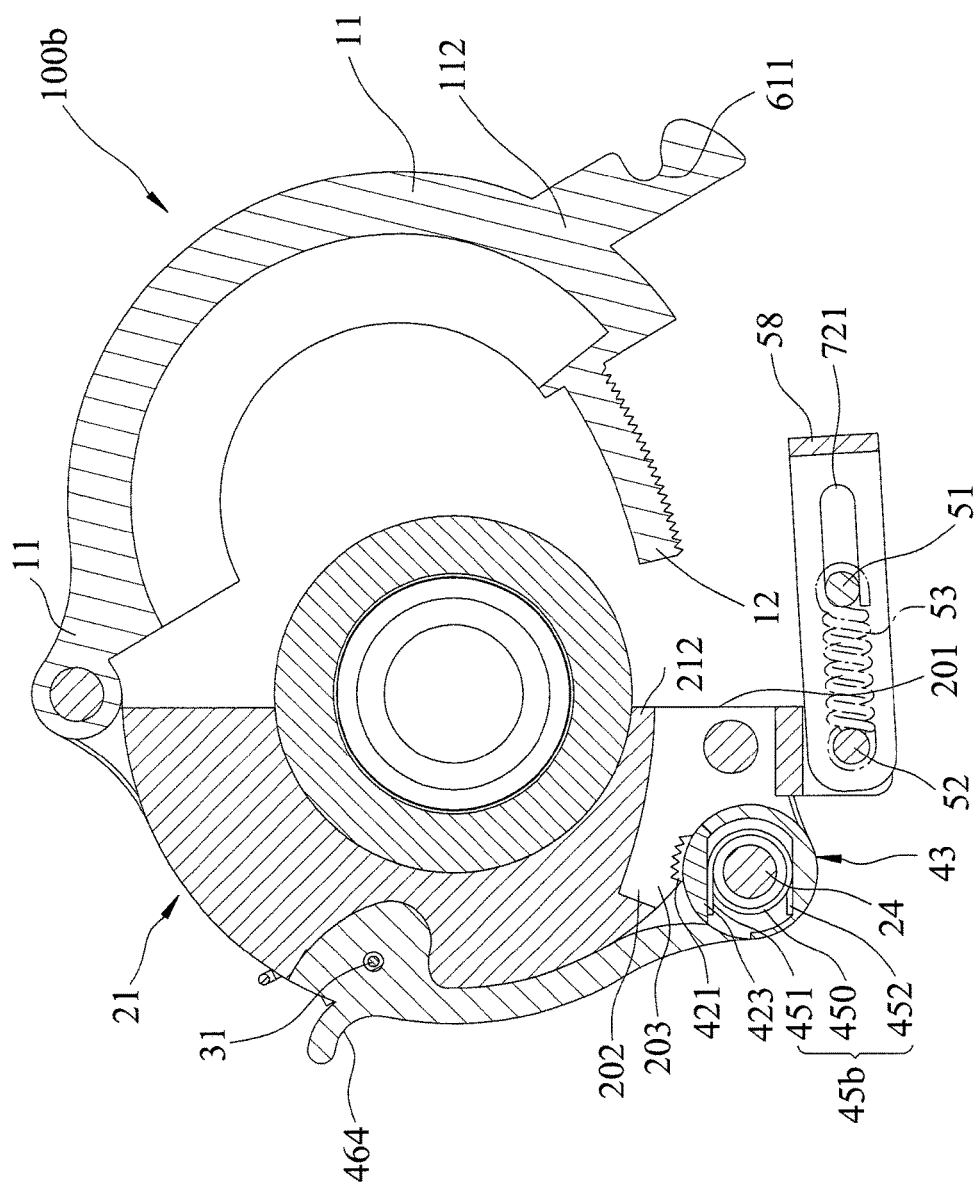
FIG. 16 is similar to FIG. 12 but illustrating a first jaw extension in an unclamped position.

With reference to FIG. 15, it can be observed that the ratchet 42 includes a ratchet body 420 and a first abutment wall 423. The ratchet body 420 is mounted rotatably on the pivot shaft 24 about the rotation axis (R), and has a rim surface 422 formed with the ratchet teeth 421. The first abutment wall 423 extends from the ratchet body 420 in the longitudinal direction (X) adjacent to the ratchet teeth 421, and has a first abutment surface 424 facing the pivot shaft 24.

In the second embodiment, the release member 46 includes a pivot end segment 461b, a distal end segment 463, and a drive lever segment 464.

The pivot end segment 461b is mounted pivotally on the mounting surface 221 about the pivot axis (A), and is configured to counteract the first biasing force of the first biasing member 45b such that the pivot end segment 461b is angularly movable between an actuated position, where the pivot end segment 461b is disposed to ensure unidirectional rotation of the ratchet 42, and a non-actuated position, where the ratchet 42 is relieved of the first biasing force of the first biasing member 45b.

As shown in FIG. 15, the pivot end segment 461b includes a top disc 465b and a second abutment wall 467b. The top disc 465b has a periphery 466b and is mounted pivotally on the pivot shaft 24 about the pivot axis (A) which is the same as the rotation axis (R). The top disc 465b and the ratchet body 420 are spaced apart from each other in the longitudinal direction (X). The second abutment wall 467b extends from the periphery 466b of the top disc 465b toward the ratchet body 420, and has a second abutment surface 468b which faces the pivot shaft 24, and which is opposite to the first abutment surface 424 of the first abutment wall 423 relative to the pivot shaft 24 (see FIG. 12).

In this embodiment, the distal end segment 463 is angularly movable between a retained position (see FIGS. 12 and 16), where the pivot end segment 461b is in the actuated position, and an unretained position (see FIG. 14), wherein the pivot end segment 461b is in the non-actuated position.

The drive lever segment 464 of the second embodiment is similar to that of the first embodiment, except that the drive lever segment 464 of the second embodiment extends outwardly from the distal end segment 463.

As shown in FIG. 12, the first biasing member 45b is a torsion spring and has a curved segment 450, a first end segment 451, and a second end segment 452. The curved segment 450 is mounted on the pivot shaft 24. The first end segment 451 extends to abut against the first abutment surface 424 of the ratchet 42. The second end segment 452 extends to abut against the second abutment surface 468b of the release member 46.

When the distal end segment 463 of the release member 46 is in the retained position (see FIGS. 12 and 16), the first end segment 451 of the torsion spring 45b delivers the first biasing force of the torsion spring 45b to act on the first abutment wall 423 to bias the ratchet teeth 421 to move into ratchet engagement with the rack teeth 122 so as to permit the ratchet 42 to rotate unidirectionally, and such that when the distal end segment 463 of the release member 46 is in the unretained position (see FIG. 14), the first abutment wall 423 is relieved of the first biasing force of the torsion spring 45b so as to permit the ratchet teeth 421 to disengage from the rack teeth 122.

Figure 8:
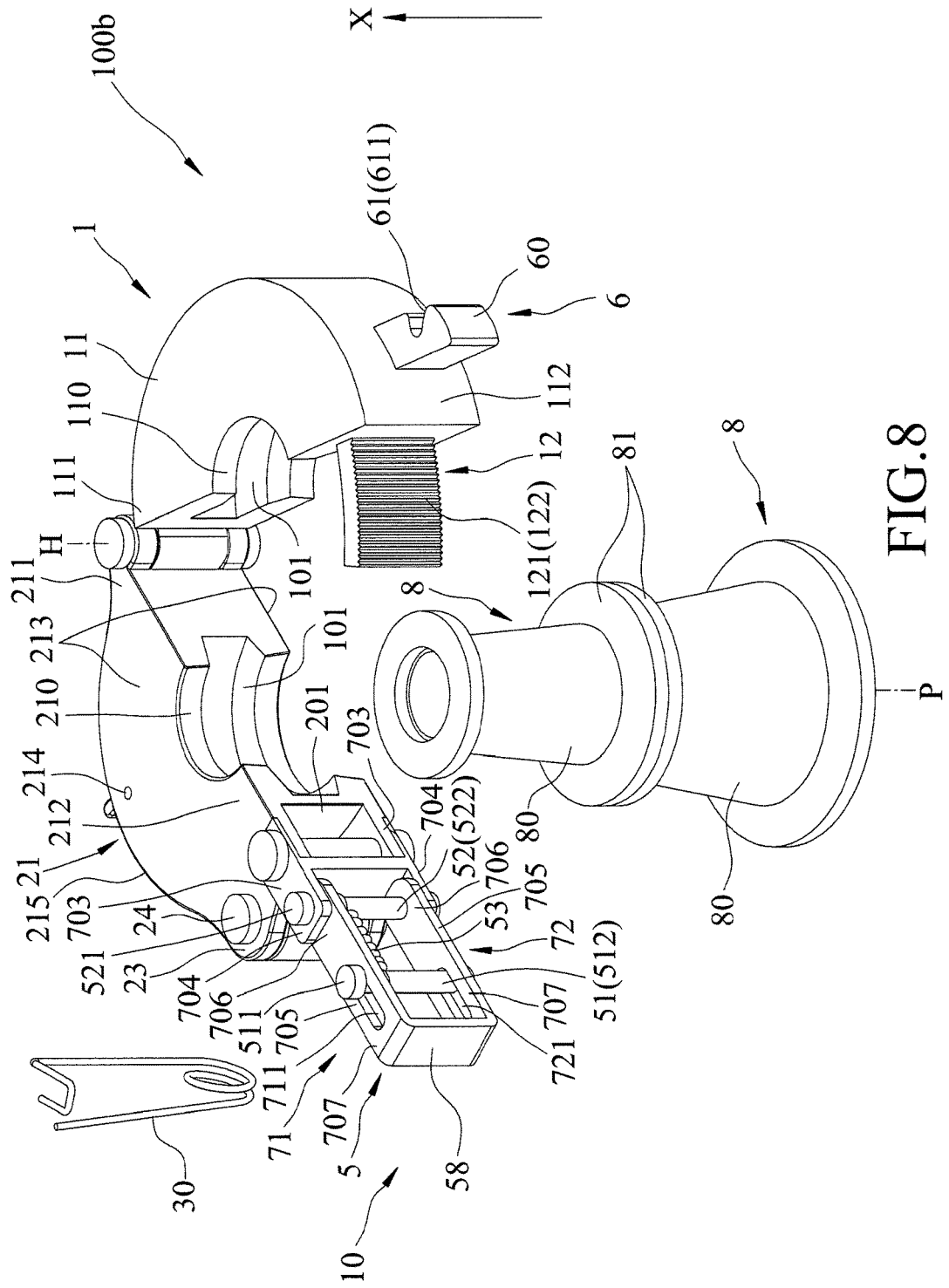
FIGS. 8 and 9 are perspective views of a pipe coupler according to a second embodiment of the disclosure.
Figure 9:
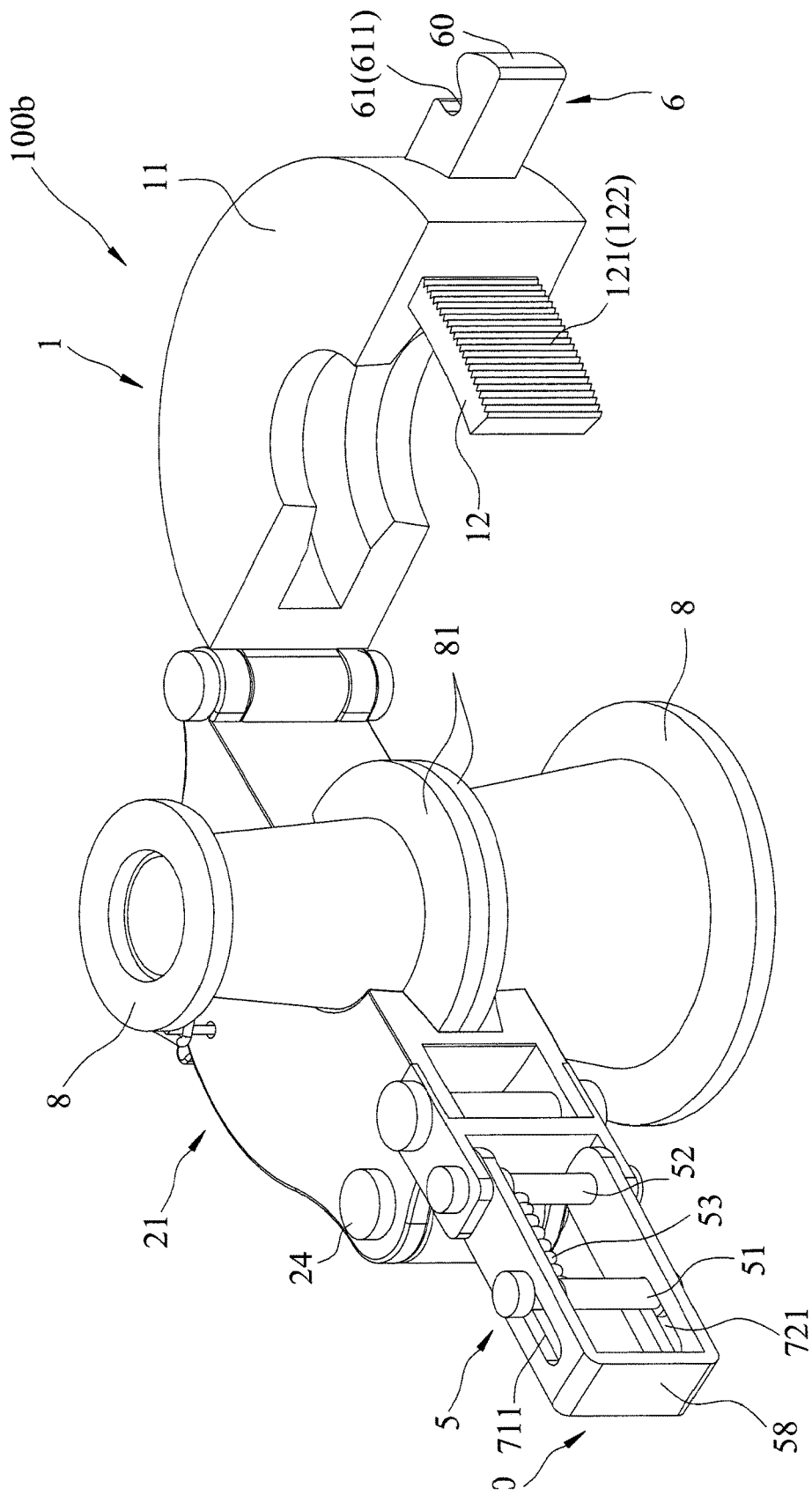
Figure 10:
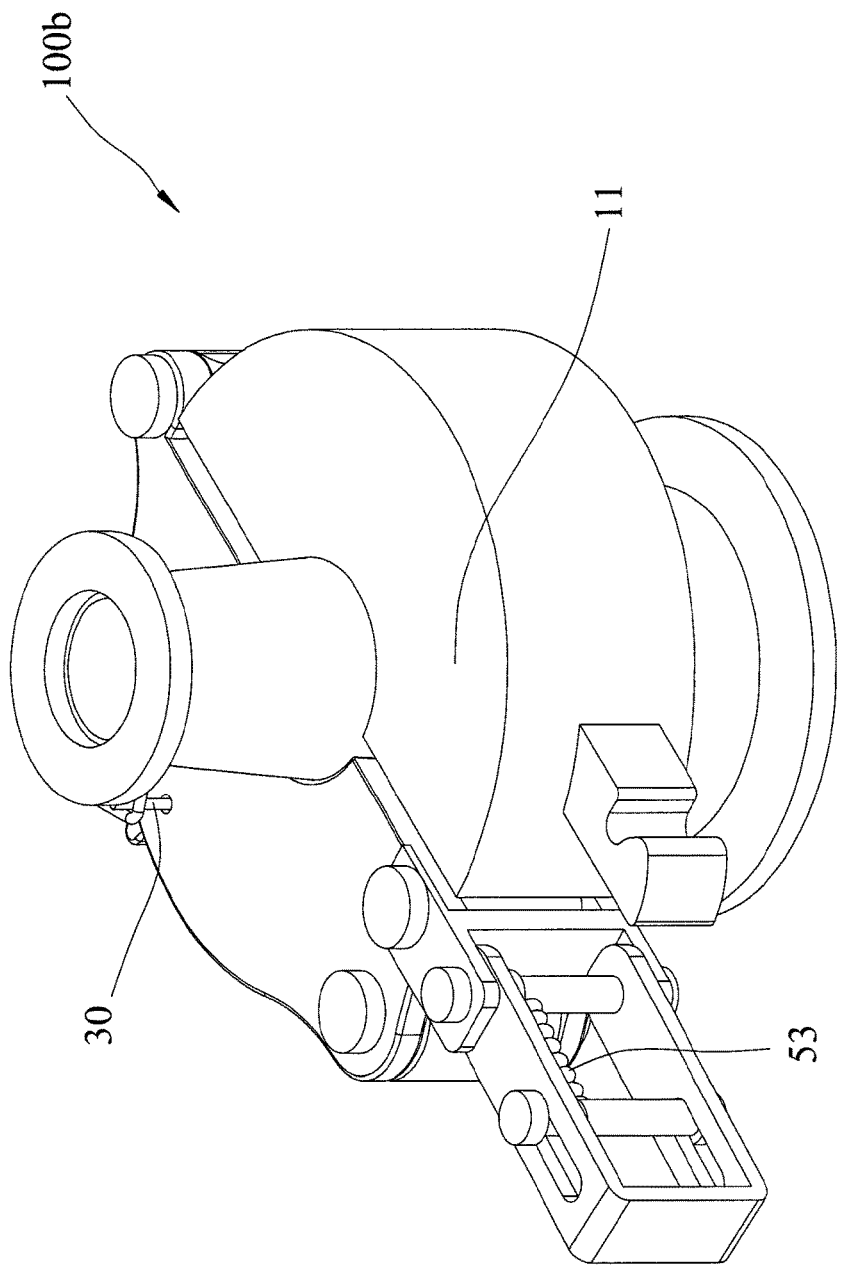
FIG. 10 is similar to FIG. 8 but illustrating that two pipes are brought, by the pipe coupler, into fluid-tight engagement with each other.
Figure 11:
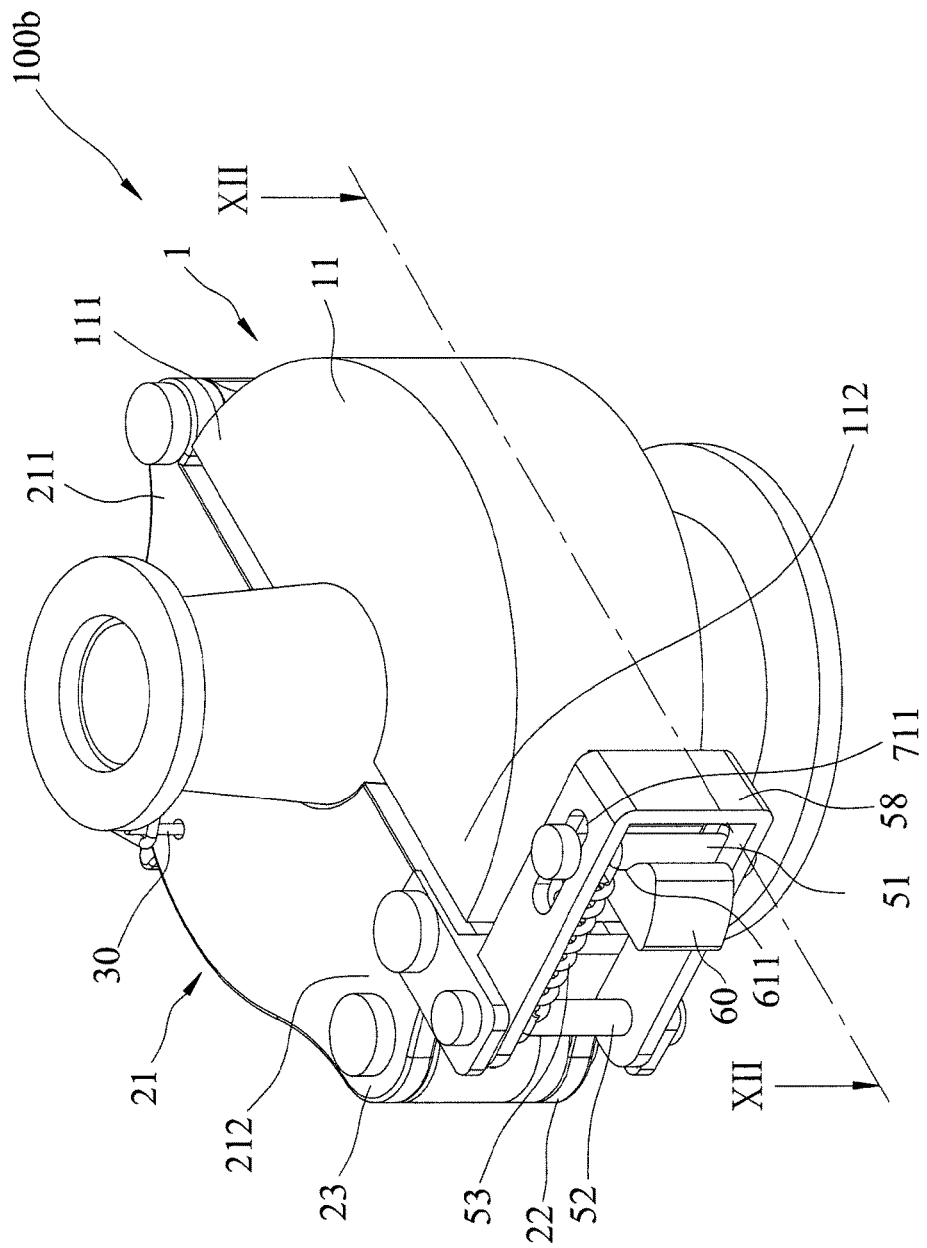
FIG. 11 is similar to FIG. 10 but illustrating that first and second locking end segments of first and second jaw members are locked together by virtue of a locking mechanism.

In the second embodiment, as shown in FIG. 8, each of the first and second cantilevers 71, 72 extends from the second locking end segment 212 and the anchor member 6 is mounted on the first locking end segment 112.

Furthermore, each of the first and second cantilevers 71, 72 has a mounted segment 703 and a pivot segment 705. The mounted segment 703 extends from the second locking end segment 212 to terminate at a joining region 704. The pivot segment 705 has a joined region 706 mounted pivotally to the joining region 704 of the mounted segment 703, and a distal region 707 having a corresponding one of the first and second guiding slots 711, 721.

In the second embodiment, a bridging bar 58 is disposed to bridge the distal regions 707 of the first and second cantilevers 71, 72.

In the second embodiment, a pivot pin 52 extends in the longitudinal direction (X), and has a first pin end segment 521 and a second pin end segment 522. The first pin end segment 521 is configured to permit the joined region 706 of the first cantilever 71 to be pivotally mounted to the joining region 704 of the first cantilever 71. The second pin end segment 522 is configured to permit the joined region 706 of the second cantilever 72 to be pivotally mounted to the joining region 704 of the second cantilever 72.

In the second embodiment, the second biasing member 53 is disposed to couple the movable key 51 to the pivot pin 52 so as to bias the movable key 51 to the proximate position.

In the second embodiment, the movable key 51 is configured to be retained in the recess 611.

FIGS. 17 to 20 illustrate a pipe coupler 100c according to a third embodiment of the disclosure. The third embodiment is similar to the first embodiment, except the configurations of the locking mechanism 10.

Figure 17:
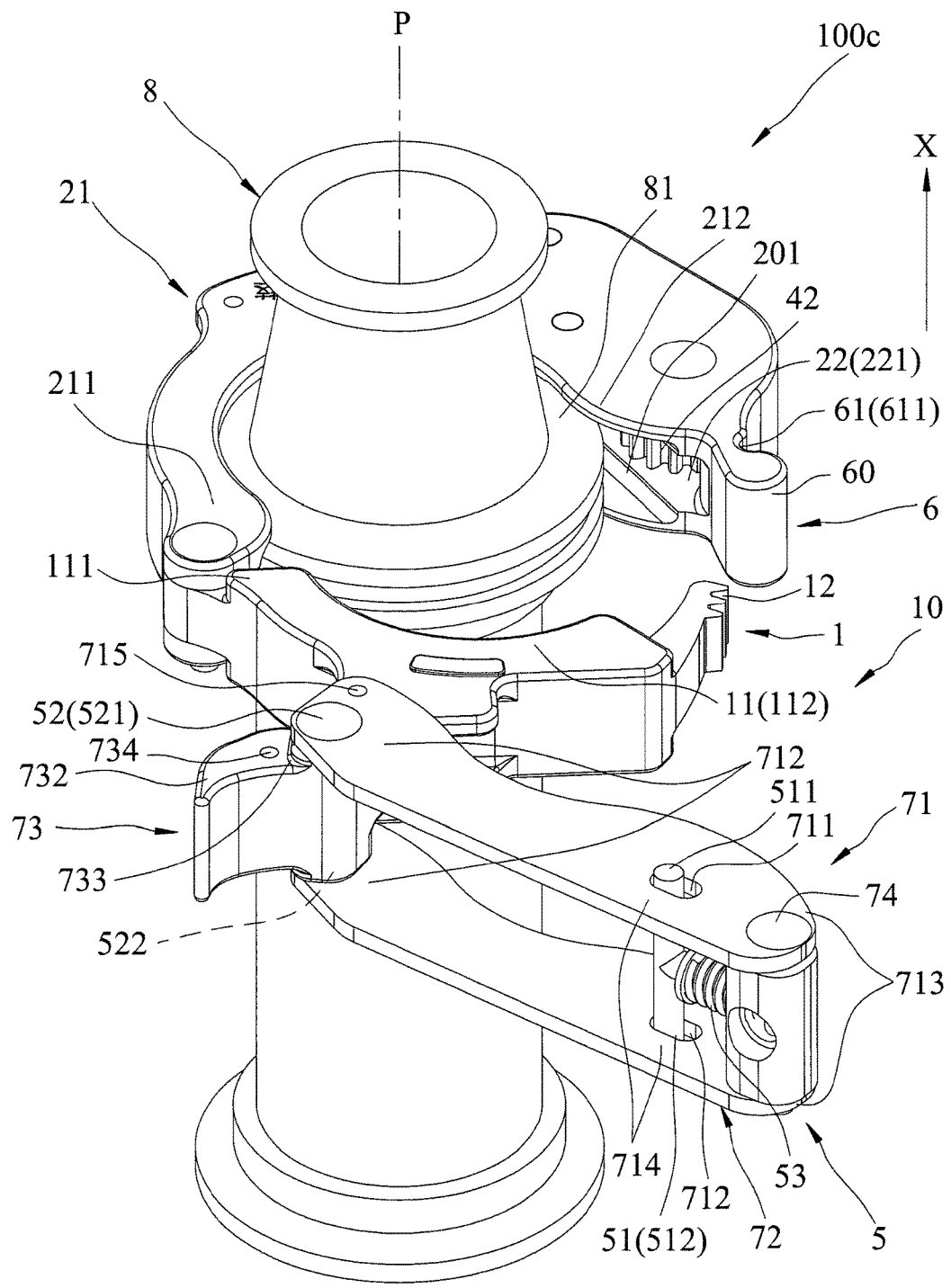
FIG. 17 is a perspective view of a pipe coupler according to a third embodiment of the disclosure.
Figure 18:
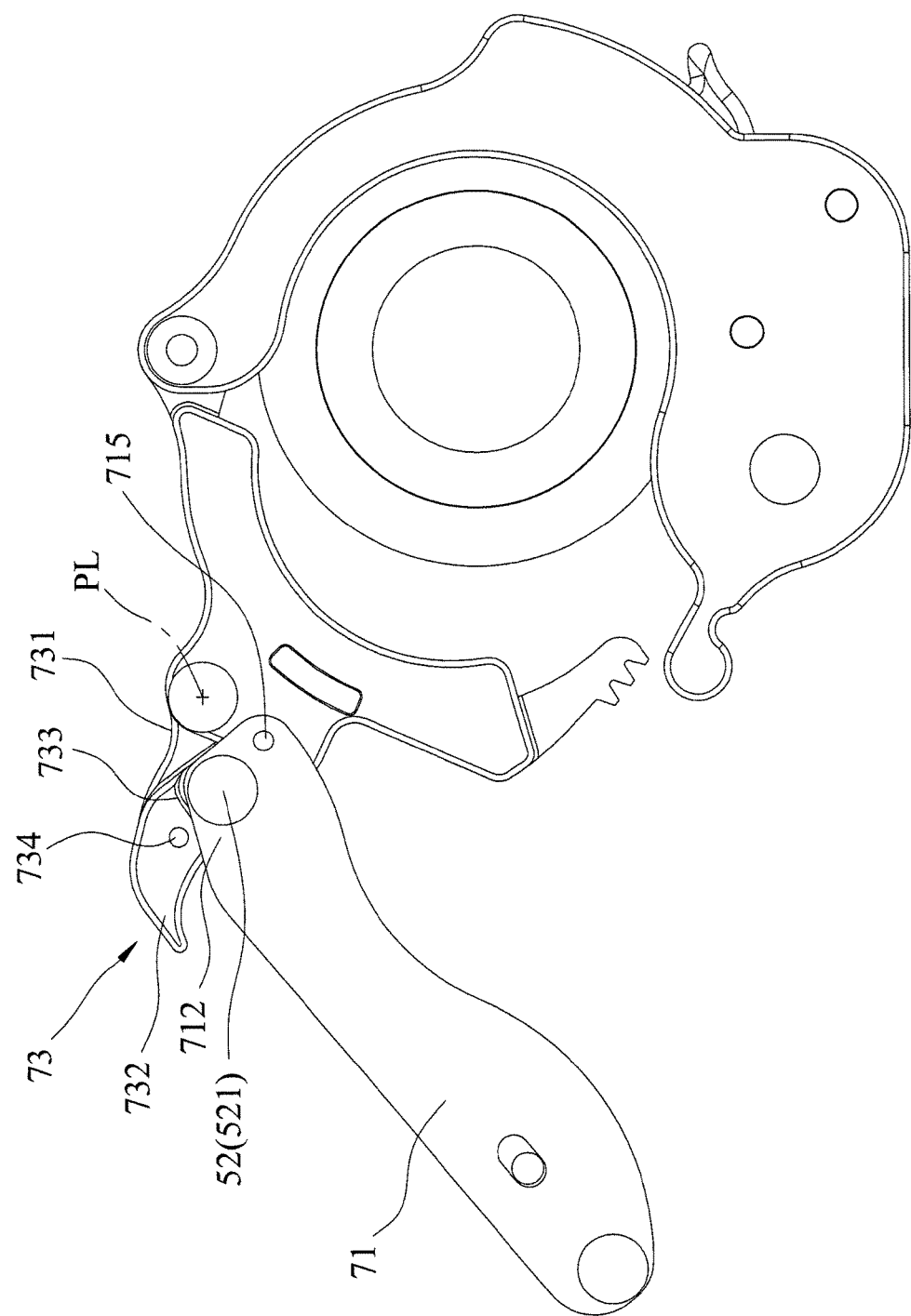
FIG. 18 is a top view of the pipe coupler shown in FIG. 17.

As shown in FIG. 17, each of the first and second cantilevers 71, 72 has a proximate cantilever segment 712, a distal cantilever segment 713, and amid segment 714 which is disposed between the proximate and distal cantilever segments 712, 713, and which has a corresponding one of the first and second guiding slots 711, 721. The proximate cantilever segment 712 of each of the first and second cantilevers 71, 72 has a cantilever through bore 715.

In addition, the locking mechanism 10 further includes an angular lever 73, a bridging bar 74, and a pin member 30.

Figure 19:
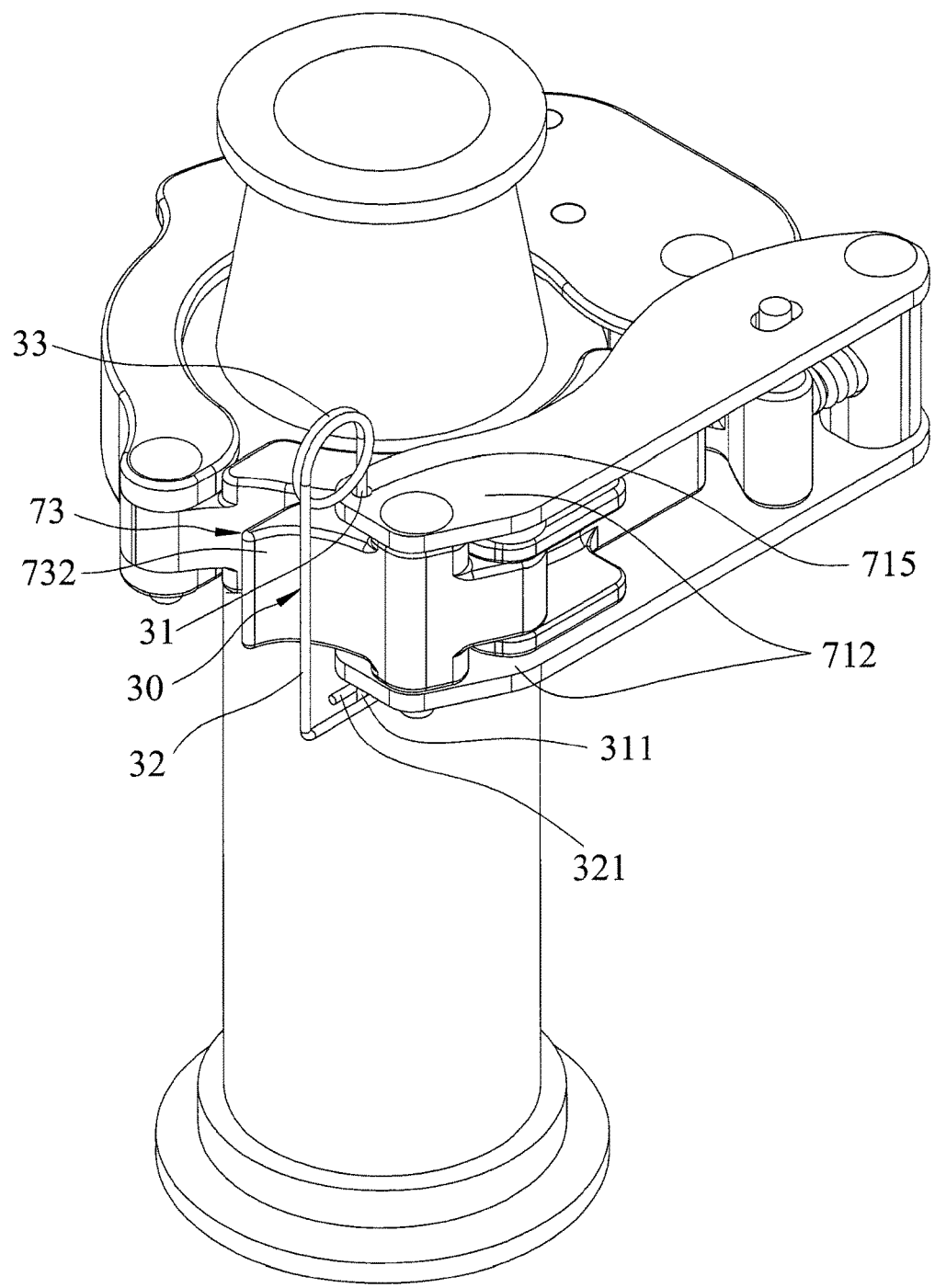
FIG. 19 is similar to FIG. 17 except that a power area of an angular lever of the pipe coupler is in a tightened position.
Figure 20:
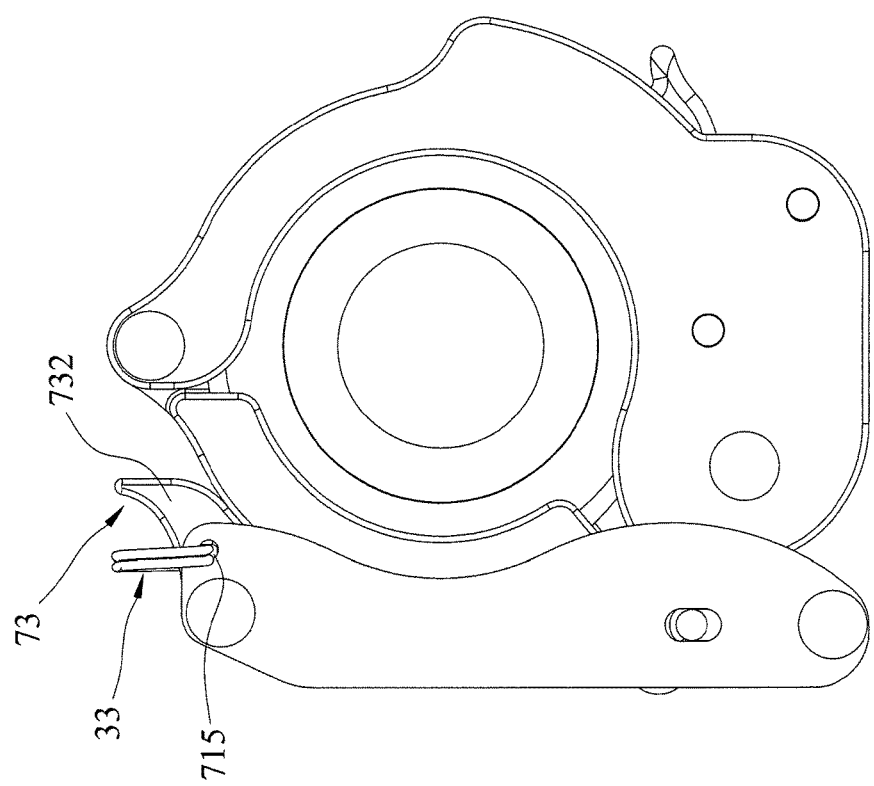
FIG. 20 is a top view of the pipe coupler shown in FIG. 19.

The angular lever 73 has a fulcrum area 731, a power area 732, and a weight area 733. The fulcrum area 731 is pivotably mounted on the first locking end segment 112 about a pivot lever axis (PL) (see FIG. 18). The power area 732 is angularly movable about the pivot lever axis (PL) between a loose position (FIGS. 17 and 18) and a tightened position (FIGS. 19 and 20). In the loose position, the power area 732 is distal from the first locking end segment 112. In the tightened position, the power area 732 is closer to the first locking end segment 112. The weight area 733 is angularly displaced from the power region 732 about the pivot lever axis (PL). The angular lever 73 has a lever through hole 734 configured to be in alignment with the cantilever through bores 715 of the proximate cantilever segments 712 of the first and second cantilevers 71, 72 when the power area 732 of the angular lever 73 is in the tightened position.

The bridging bar 74 interconnects the distal cantilever segments 713 of the first and second cantilevers 71, 72.

In this embodiment, the pivot pin 52 extends through the weight area 733 to terminate at a first pin end segment 521 and a second pin end segment 522. The proximate cantilever segment 712 of each of the first and second cantilevers 71, 72 is pivotally mounted to a corresponding one of the first and second pin end segments 521, 522.

Furthermore, in this embodiment, the second biasing member 53 is disposed to couple the movable key 51 to the bridging bar 74 so as to bias the movable key 51 to the proximate position such that when the power region 732 of the angular lever 73 is angularly moved from the loose position to the tightened position, the proximate cantilever segments 712 of the first and second cantilevers 71, 72 are brought to angularly move with the weight region 733 about the pivot lever axis (PL) to thereby permit the movable key 51 to be tightened against the engaged surface 61.

The pin member 30 has a first pin segment 31, a second pin segment 32, and a spring segment 33. The first pin segment 31 extends from the spring segment 33 to terminate at a pin end 311. The second pin segment 32 extends from the spring segment 33 to terminate at a hook end 321. The first and second pin segments 31, 32 are arranged such that when the first pin segment 31 extends through the lever through hole 734 of the angular lever 73 and the cantilever through bores 715 of the proximate cantilever segments of the first and second cantilevers 71, 72, the pin end 311 of the first pin segment 31 is permitted to be hooked by the hook end 321 of the second pin segment 32 so as to prevent the power area 732 of the angular lever 73 from moving away from the tightened position.

Figure 21:
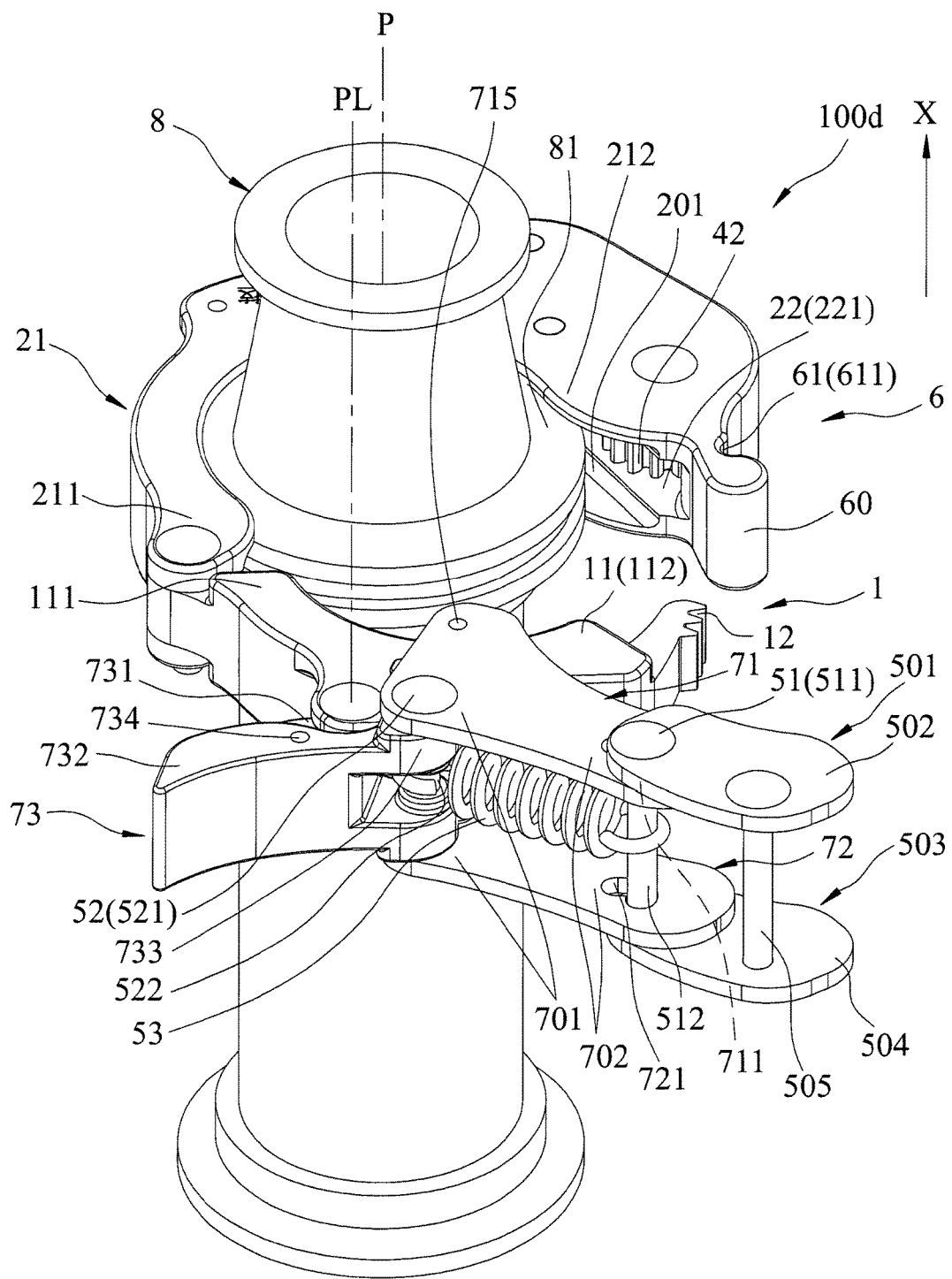
FIG. 21 is a perspective view of a pipe coupler according to a fourth embodiment of the disclosure.
Figure 22:
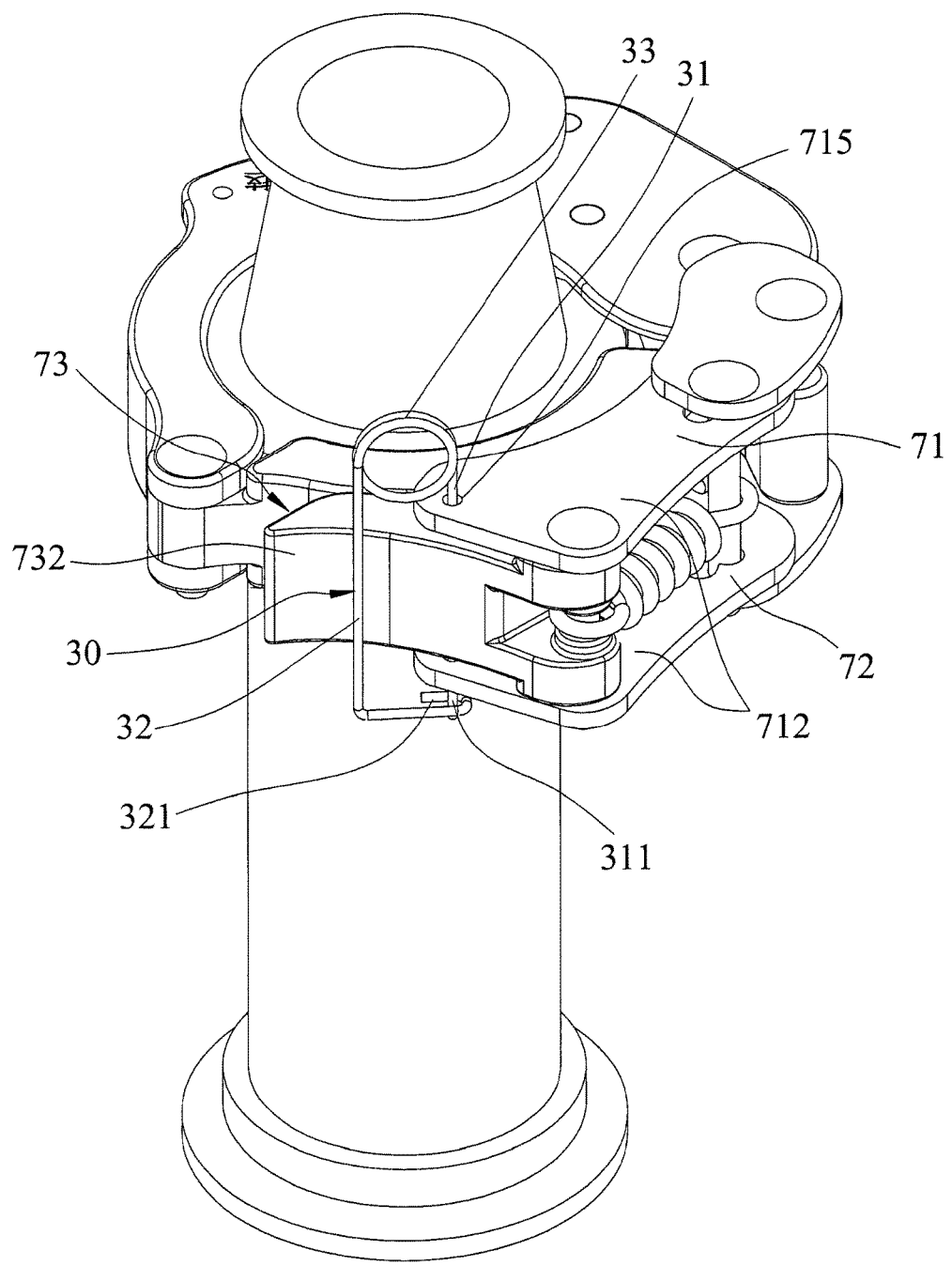
FIG. 22 is similar to FIG. 21 except that a power area of an angular lever of the pipe coupler is in a tightened position.

FIGS. 21 and 22 illustrate a pipe coupler 100d according to a fourth embodiment of the disclosure. The fourth embodiment is similar to the third embodiment, except that each of the first and second cantilevers 71, 72 has a pivot end segment 701, and a connected end segment 702 which has a corresponding one of the first and second guiding slots 711, 721. The pivot end segment 701 of each of the first and second cantilevers 71, 72 is pivotally mounted to a corresponding one of the first and second pin end segments 521, 522 of the pivot pin 52. The pivot end segment 701 of each of the first and second cantilevers 71, 72 has the cantilever through bore 715.

In this embodiment, the second biasing member 53 is disposed to couple the movable key 51 to the pivot pin 52 so as to bias the movable key 51 to the proximate position.

Furthermore, the engaging member 5 further includes a first bar 501, a second bar 503, and an engaging pin 505.

The first bar 501 extends from the first end segment 511 of the movable key 51 in a direction away from the first cantilever 71 to terminate at a first bar end segment 502 so as to permit the first bar 501 to move with the movable key 51.

The second bar 503 extends from the second end segment 512 of the movable key 51 in a direction away from the second cantilever 72 to terminate at a second bar end segment 504 so as to permit the second bar 503 to move with the movably key 51.

The engaging pin 505 interconnects the first and second bar end segments 502, 504, and is configured such that when the power region 732 of the angular lever 73 is angularly moved from the loose position (FIG. 21) to the tightened position (FIG. 22), the pivot end segments 701 of the first and second cantilevers 71, 72 are brought to angularly move with the weight region 733 about the pivot lever axis (PL) to thereby permit the engaging pin 505 to be tighten against the engaged surface 61.

In the description above, for the purposes of explanation, numerous specific details have been set forth in order to provide a thorough understanding of the embodiments. It will be apparent, however, to one skilled in the art, that one or more other embodiments maybe practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A pipe coupler for interconnecting two pipes each having a joining region, and each extending along a pipe axis in a longitudinal direction, said pipe coupler comprising:
- a first jaw member including a first hinged end segment and a first locking end segment;
- a second jaw member including a second hinged end segment which is hinged to said first hinged end segment, and a second locking end segment which is movable toward and away from said first locking end segment, said first and second jaw members being capable to define therebetween a clamping space configured to secure therein the joining regions of the two pipes;
- a first jaw extension which extends from said first locking end segment, and which includes a rack region;
- a tooth member which is rotatably mounted inside said second locking end segment, and which is configured to mesh with said rack region;
- a control unit configured to permit said tooth member to be driven by said rack region to rotate unidirectionally; and
- a locking mechanism including
  - an engaging member mounted pivotally on one of said first and second locking end segments, and
  - an engaged member mounted on the other one of said first and second locking end segments, and having an engaged surface configured to be engaged by said engaging member so as to permit said first and second locking end segments to be locked together.

2. The pipe coupler according to claim 1, further comprising a mounting board, wherein:
said first jaw member extends in a circumferential direction about the pipe axis to terminate at said first hinged end segment and said first locking end segment, said first jaw member having a first inner peripheral surface;
said first jaw extension extends from first locking end segment along the circumferential direction, and said rack region has a plurality of rack teeth displaced from each other in the circumferential direction;
said second jaw member extends in the circumferential direction to terminate at said second hinged end segment and said second locking end segment, and has a second inner peripheral surface, said second locking end segment defining therein an open channel which extends along the circumferential direction, and which has an inner guiding region and an outer mounting region, said second hinged end segment being hinged to said first hinged end segment about a hinge axis parallel to the pipe axis so as to permit said first jaw extension to be movable among an unclamped position, where said first jaw extension is disposed outwardly of said inner guiding region, a partially clamped position, where said first jaw extension is partially extended into said inner guiding region, and a fully clamped position, where said first jaw extension is deeply extended into said inner guiding region such that said first and second inner peripheral surfaces of said first and second jaw members are tightened against the joining regions of the two pipes thereby allowing the two pipes to be brought into fluid-tight engagement with each other;
said mounting board extends outwardly from said outer mounting region and has a mounting surface;
said tooth member is a ratchet mounted rotatably on said mounting surface about a rotation axis parallel to the pipe axis, said ratchet having a plurality of ratchet teeth which are angularly displaced from each other about the rotation axis, and which are configured to mesh with said rack teeth at said outer mounting region so as to permit said ratchet to be driven by said rack teeth to rotate about the rotation axis;
said control unit includes
  - a first biasing member disposed such that said first jaw extension is permitted to drive said ratchet to rotate unidirectionally against a first biasing force of said first biasing member, and
  - a release member having
    - a pivot end segment which is mounted pivotally on said mounting surface about a pivot axis, and which is configured to counteract the first biasing force of said first biasing member such that said pivot end segment is angularly movable between an actuated position, where said pivot end segment is disposed to ensure unidirectional rotation of said ratchet, and a non-actuated position, where said ratchet is relieved of the first biasing force of said first biasing member, and
    - a distal end segment which is angularly movable between a retained position, where said pivot end segment is in the actuated position, and an unretained position, wherein said pivot end segment is in the non-actuated position.

3. The pipe coupler according to claim 2, wherein each of said first and second inner peripheral surfaces of said first and second jaw members has a jaw groove region which extends in the circumferential direction, and which is configured such that when said first jaw extension is in fully clamped position, the joining regions of the two pipes are permitted to be brought into fitting engagement in said jaw groove region.

4. The pipe coupler according to claim 2, wherein said control unit further includes a pawl member having
- a fulcrum region mounted pivotally on said mounting surface of said mounting board,
- a weight region disposed to be biased by said first biasing member to engage with said ratchet such that said ratchet is driven to rotate unidirectionally, and
- a power region disposed between said fulcrum region and said weight region, wherein
said pivot end segment of said release member has a cam surface which extends about the pivot axis, and which acts against said power region to generate a camming action such that when said pivot end segment of said release member is moved to the actuated position, said weight region is engaged with said ratchet, and such that when said pivot end segment of said release member is moved to the non-actuated position, said weight region is moved against the first biasing force of said first biasing member to be disengaged from said ratchet.

5. The pipe coupler according to claim 2, wherein said control unit further includes a pivot shaft mounted on said mounting surface and extending along the rotation axis, wherein:
said ratchet includes
- a ratchet body mounted rotatably on said pivot shaft about the rotation axis, and having a rim surface formed with said ratchet teeth, and
- a first abutment wall which extends from said ratchet body in the longitudinal direction adjacent to said ratchet teeth, and which has a first abutment surface facing said pivot shaft;

said pivot end segment of said release member includes
  a top disc having a periphery and mounted pivotally on said pivot shaft about the pivot axis which is the same as the rotation axis, said top disc and said ratchet body being spaced apart from each other in the longitudinal direction, and
  a second abutment wall extending from said periphery of said top disc toward said ratchet body, and having a second abutment surface which faces said pivot shaft, and which is opposite to said first abutment surface of said first abutment wall relative to said pivot shaft; and
said first biasing member is a torsion spring and has a curved segment mounted on said pivot shaft, a first end segment extending to abut against said first abutment surface of said ratchet, and a second end segment extending to abut against said second abutment surface of said release member such that when said distal end segment of said release member is in the retained position, said first end segment of said torsion spring delivers the first biasing force of said torsion spring to act on said first abutment wall to bias said ratchet teeth to move into ratchet engagement with said rack teeth so as to permit said ratchet to rotate unidirectionally, and such that when said distal end segment of said release member is in the unretained position, said first abutment wall is relieved of the first biasing force of said torsion spring so as to permit said ratchet teeth to disengage from said rack teeth.

6. The pipe coupler according to claim 2, wherein said second jaw member has two sidewall surfaces opposite to each other in the longitudinal direction, and a through bore extending through said two sidewall surfaces of said second jaw member, said distal end segment of said release member having a through hole which is in alignment with said through bore of said second jaw member when said distal end segment of said release member is in the retained position,
  said pipe coupler further comprising a pin member having
    a spring segment,
    a first pin segment extending from said spring segment to terminate at a pin end, and
    a second pin segment extending from said spring segment to terminate at a hook end, said first and second pin segments being arranged such that when said first pin segment extends through said through bore and said through hole, said pin end of said first pin segment is permitted to be hooked by said hook end of said second pin segment so as to prevent said distal end segment of said release member from moving away from the retained position.

7. The pipe coupler according to claim 6, wherein each of said two sidewall surfaces of said second jaw member has a peripheral edge, said pipe coupler further comprising a shielding member which extends from said peripheral edge of a corresponding one of said two sidewall surfaces over said mounting board so as to cover said ratchet, said second jaw member, said shielding member, and said mounting board being integrally formed.

8. The pipe coupler according to claim 1, wherein said locking mechanism includes
  a first cantilever extending from said one of said first and second locking end segments, and having a first guiding slot,
  a second cantilever extending from said one of said first and second locking end segments, and having a second guiding slot in alignment with said first guiding slot,
  said engaging member including a movable key which extends parallel to the pipe axis to terminate at a first end segment and a second end segment, said first and second end segments of said movable key being slidably and respectively engaged in said first and second guiding slots so as to permit said movable key to be movable between a distal position and a proximate position relative to said one of said first and second locking end segments,
  a second biasing member disposed to bias said movable key to the proximate position, and
  said engaged member which is an anchor member mounted on said the other one of said first and second locking end segments, said anchor member having a guide wall and said engaged surface defining a recess such that once said first jaw extension is in the fully clamped position, the movement of said movable key toward the distal position against a second biasing force of said second biasing member permits said engaging member to slip over said guide wall and be retained in said recess by virtue of the second biasing force.

9. The pipe coupler according to claim 8, wherein said locking mechanism further includes a pivot pin extending through said one of said first and second locking end segments to terminate at a first pin end segment and a second pin end segment, said second biasing member being disposed to couple said movable key to said pivot pin so as to bias said movable key to the proximate position, each of said first and second cantilevers having a pivot end segment mounted pivotally to a corresponding one of said first and second pin end segments of said pivot pin, and a connected end segment having a corresponding one of said first and second guiding slots, said engaging member further including
  a first bar extending from said first end segment of said movable key in a direction away from said first cantilever to terminate at a first bar end segment so as to permit said first bar to move with said movable key,
  a second bar extending from said second end segment of said movable key in a direction away from said second cantilever to terminate at a second bar end segment so as to permit said second bar to move with said movably key, and
  an engaging pin interconnecting said first and second bar end segments, and configured to be retained in said recess.

10. The pipe coupler according to claim 8, wherein:
each of said first and second cantilevers has
  a mounted segment extending from said one of said first and second locking end segments to terminate at a joining region, and
  a pivot segment having a joined region mounted pivotally to said joining region of said mounted segment, and a distal region having a corresponding one of said first and second guiding slots;
said locking mechanism further includes a pivot pin which extends in the longitudinal direction, and which has
  a first pin end segment configured to permit said joined region of said first cantilever to be pivotally mounted to said joining region of said first cantilever, and
  a second pin end segment configured to permit said joined region of said second cantilever to be pivotally mounted to said joining region of said second cantilever;

said second biasing member is disposed to couple said movable key to said pivot pin so as to bias said movable key to the proximate position; and said movable key is configured to be retained in said recess.

11. The pipe coupler according to claim 8, wherein:

each of said first and second cantilevers has a proximate cantilever segment, a distal cantilever segment, and a mid segment which is disposed between said proximate and distal cantilever segments, and which has a corresponding one of said first and second guiding slots;

said locking mechanism further includes an angular lever having
- a fulcrum area pivotably mounted on said one of said first and second locking end segments about a pivot lever axis,
- a power area which is angularly movable about the pivot lever axis between a loose position, where said power area is distal from said one of said first and second locking end segments, and a tightened position, where said power area is closer to said one of said first and second locking end segments, and
- a weight area which is angularly displaced from said power region about the pivot lever axis,
- a pivot pin extending through said weight area to terminate at a first pin end segment and a second pin end segment, said proximate cantilever segment of each of said first and second cantilevers being pivotally mounted to a corresponding one of said first and second. pin end segments, and
- a bridging bar interconnecting said distal cantilever segments of said first and second cantilevers; and said second biasing member being disposed to couple said movable key to said bridging bar so as to bias said movable key to the proximate position such that when said power region of said angular lever is angularly moved from the loose position to the tightened position, said proximate cantilever segments of said first and second cantilevers are brought to angularly move with said weight region about the pivot lever axis to thereby permit said movable key to be tightened against said engaged surface.

12. The pipe coupler according to claim 11, wherein said proximate cantilever segment of each of said first and second cantilevers has a cantilever through bore, and said angular lever has a lever through hole configured to be in alignment with said cantilever through bores of said proximate cantilever segments of said first and second cantilevers when said power area of said angular lever is in the tightened position, said pipe coupler further comprising a pin member having
- a spring segment,
- a first pin segment extending from said spring segment to terminate at a pin end, and
- a second pin segment extending from said spring segment to terminate at a hook end, said first and second pin segments being arranged such that when said first pin segment extends through said lever through hole of said angular lever and said cantilever through bores of said proximate cantilever segments of said first and second cantilevers, said pin end of said first pin segment is permitted to be hooked by said hook end of said second pin segment so as to prevent said power area of said angular lever from moving away from the tightened position.

13. The pipe coupler according to claim 8, wherein:

each of said first and second cantilevers has a pivot end segment, and a connected end segment which has a corresponding one of said first and second guiding slots;

said locking mechanism further includes an angular lever having
- a fulcrum area pivotably mounted on said one of said first and second locking end segments about a pivot lever axis,
- a power area which is angularly movable about the pivot lever axis between a loose position, where said power area is distal from said one of said first and second locking end segments, and a tightened position, where said power area is closer to said one of said first and second locking end segments, and
- a weight area which is angularly displaced from said power region about the pivot lever axis, and
- a pivot pin extending through said weight area to terminate at a first pin end segment and a second pin end segment, said pivot end segment of each of said first and second cantilevers being pivotally mounted to a corresponding one of said first and second pin end segments;

said second biasing member is disposed to couple said movable key to said pivot pin so as to bias said movable key to the proximate position;

said engaging member further includes
- a first bar extending from said first end segment of said movable key in a direction away from said first cantilever to terminate at a first bar end segment so as to permit said first bar to move with said movable key,
- a second bar extending from said second end segment of said movable key in a direction away from said second cantilever to terminate at a second bar end segment so as to permit said second bar to move with said movably key, and
- an engaging pin interconnecting said first and second bar end segments, and configured such that when said power region of said angular lever is angularly moved from the loose position to the tightened position, said pivot end segments of said first and second cantilevers are brought to angularly move with said weight region about the pivot lever axis to thereby permit said engaging pin to be tighten against said engaged surface.

14. The pipe coupler according to claim 13, wherein said pivot end segment of each of said first and second cantilevers has a cantilever through bore, and said angular lever has a lever through hole configured to be in alignment with said cantilever through bores of said pivot end segments of said first and second cantilevers when said power area of said angular lever is in the tightened position, said pipe coupler further comprising a pin member having
- a spring segment,
- a first pin segment extending from said spring segment to terminate at a pin end, and
- a second pin segment extending from said spring segment to terminate at a hook end, said first and second pin segments being arranged such that when said first pin segment extends through said lever through hole of said angular lever and said cantilever through bores of said pivot end segment of said first and second cantilevers, said pin end of said first pin segment is permitted to be hooked by said hook end of said second pin segment so as to prevent said power area of said angular lever from moving away from the tightened position.

15. A pipe coupler for interconnecting two pipes each having a joining region and each extending along a pipe axis in a longitudinal direction, said pipe coupler comprising:
   a first jaw unit including
      a first jaw member which extends in a circumferential direction about the pipe axis to terminate at a first hinged end segment and a first locking end segment, and which has a first inner peripheral surface, and
      a first jaw extension which extends from said first locking end segment along the circumferential direction, and which has a plurality of rack teeth displaced from each other in the circumferential direction;
   a second jaw member which extends in the circumferential direction to terminate at a second hinged end segment and a second locking end segment, and which has a second inner peripheral surface, said second locking end segment defining therein an open channel which extends along the circumferential direction, and which has an inner guiding region and an outer mounting region, said second hinged end segment being hinged to said first hinged end segment about a hinge axis parallel to the pipe axis so as to permit said first jaw extension to be movable among an unclamped position, where said first jaw extension is disposed outwardly of said inner guiding region, a partially clamped position, where said first jaw extension is partially extended into said inner guiding region, and a fully clamped position, where said first jaw extension is deeply extended into said inner guiding region such that said first and second inner peripheral surfaces of said first and second jaw members are tightened against the joining regions of the two pipes thereby allowing the two pipes to be brought into fluid-tight engagement with each other;
   a mounting board extending outwardly from said outer mounting region, and having a mounting surface;
   a ratchet mounted rotatably on said mounting surface about a rotation axis parallel to the pipe axis, and having a plurality of ratchet teeth which are angularly displaced from each other about the rotation axis, and which are configured to mesh with said rack teeth at said outer mounting region so as to permit said ratchet to be driven by said rack teeth to rotate about the rotation axis;
   a first biasing member disposed such that said first jaw extension is permitted to drive said ratchet to rotate unidirectionally against a first biasing force of said first biasing member; and
   a release member having
      a pivot end segment which is mounted pivotally on said mounting surface about a pivot axis, and which is configured to counteract the first biasing force of said first biasing member such that said pivot end segment is angularly movable between an actuated position, where said pivot end segment is disposed to ensure unidirectional rotation of said ratchet, and a non-actuated position, where said ratchet is relieved of the first biasing force of said first biasing member, and
      a distal end segment which is angularly movable between a retained position, where said pivot end segment is in the actuated position, and an unretained position, wherein said pivot end segment is in the non-actuated position.

* * * * *